United States Patent
Irwin et al.

(10) Patent No.: US 8,484,130 B2
(45) Date of Patent: Jul. 9, 2013

(54) SYSTEM AND METHOD FOR A FLEXIBLE DEVICE-BASED RATING ENGINE

(75) Inventors: Scott Andrew Irwin, Winter Springs, FL (US); Robert Dennis Birch, Orlando, FL (US); Joseph Paul Lupo, Apopka, FL (US); Stephen DeWayne Weagraff, Orlando, FL (US)

(73) Assignee: Convergys Information Management Group, Inc., Cincinnati, OH (US)

( * ) Notice: Subject to any disclaimer, the term of this patent is extended or adjusted under 35 U.S.C. 154(b) by 2485 days.

(21) Appl. No.: 10/392,496

(22) Filed: Mar. 20, 2003

(65) Prior Publication Data

US 2003/0187794 A1    Oct. 2, 2003

Related U.S. Application Data

(60) Provisional application No. 60/367,964, filed on Mar. 27, 2002, provisional application No. 60/375,455, filed on Apr. 25, 2002, provisional application No. 60/414,122, filed on Sep. 27, 2002.

(51) Int. Cl.
*G06Q 40/00* (2012.01)

(52) U.S. Cl.
USPC .......................................................... 705/40

(58) Field of Classification Search
USPC .......................................................... 705/40
See application file for complete search history.

(56) References Cited

U.S. PATENT DOCUMENTS

| | | | |
|---|---|---|---|
| 5,325,418 A | 6/1994 | McGregor et al. | |
| 5,577,100 A | 11/1996 | McGregor et al. | |
| 5,619,247 A | 4/1997 | Russo | |
| 5,625,669 A | 4/1997 | McGregor et al. | |
| 5,631,947 A | 5/1997 | Wittstein et al. | |
| 5,703,940 A | 12/1997 | Sattar et al. | |
| 5,806,045 A * | 9/1998 | Biorge et al. | 705/14 |
| 5,811,770 A * | 9/1998 | Bonnemoy | 235/380 |
| 6,138,004 A | 10/2000 | McGregor et al. | |
| 6,182,054 B1 | 1/2001 | Dickinson et al. | |
| 6,198,915 B1 | 3/2001 | McGregor et al. | |
| 6,199,047 B1 * | 3/2001 | Dimino et al. | 705/10 |
| 6,208,998 B1 | 3/2001 | Marcus | |

(Continued)

FOREIGN PATENT DOCUMENTS

| | | |
|---|---|---|
| JP | 9288749 | 11/1997 |
| WO | WO 97/19568 | 5/1997 |

OTHER PUBLICATIONS

NA9206315, Portable Self Checkout Retail System, Jun. 1, 1992, IBM Technical Disclosure Bulletin, vol. 25, Issue 1A: pp. 315-318.*

(Continued)

*Primary Examiner* — Jessica Lemieux
(74) *Attorney, Agent, or Firm* — Foley & Lardner LLP

(57) ABSTRACT

A system and method for computerized metering, rating, billing and managing of account balances on an end computing device is disclosed herein wherein the end device may facilitate such processing whether the device is connected or is not connected to a network. The end device, furthermore, initiates communications with a host processor to obtain updated algorithms, rating tables and other accouterments necessary or desired to meter, rate, and process payments for transaction events. The end device initiates communications with the host processor or another end device to facilitate the synchronization of usage for pricing plans that span one or more devices.

18 Claims, 21 Drawing Sheets

U.S. PATENT DOCUMENTS

| | | | |
|---|---|---|---|
| 6,230,188 B1 | 5/2001 | Marcus | |
| 6,237,145 B1 | 5/2001 | Narasimhan et al. | |
| 6,240,401 B1 | 5/2001 | Oren et al. | |
| 6,243,574 B1 | 6/2001 | McGregor et al. | |
| 6,259,776 B1 * | 7/2001 | Hunt | 379/114.01 |
| 6,295,528 B1 | 9/2001 | Marcus et al. | |
| 6,353,795 B1 | 3/2002 | Ranjan | |
| 6,381,316 B2 | 4/2002 | Joyce et al. | |
| 6,434,238 B1 | 8/2002 | Chaum et al. | |
| 6,442,544 B1 | 8/2002 | Kohli | |
| 6,443,574 B1 | 9/2002 | Howell et al. | |
| 6,460,072 B1 | 10/2002 | Arnold et al. | |
| 6,490,601 B1 | 12/2002 | Markus et al. | |
| 6,499,042 B1 | 12/2002 | Hamann | |
| 6,535,726 B1 | 3/2003 | Johnson | |
| 6,650,887 B2 | 11/2003 | McGregor et al. | |
| 6,653,946 B1 * | 11/2003 | Hassett | 340/928 |
| 6,832,084 B1 | 12/2004 | Deo et al. | |
| 7,068,643 B1 | 6/2006 | Hammond | |
| 7,155,417 B1 | 12/2006 | Sagar et al. | |
| 7,240,093 B1 * | 7/2007 | Danieli et al. | 709/205 |
| 2002/0022471 A1 * | 2/2002 | Watler et al. | 455/405 |
| 2002/0025795 A1 | 2/2002 | Sharon et al. | |
| 2002/0144275 A1 | 10/2002 | Kay et al. | |
| 2003/0040962 A1 | 2/2003 | Lewis | |
| 2003/0074229 A1 * | 4/2003 | Heise et al. | 705/4 |
| 2003/0097299 A1 | 5/2003 | O'Kane et al. | |
| 2004/0102190 A1 | 5/2004 | Forsberg et al. | |
| 2004/0167837 A1 | 8/2004 | Reel et al. | |
| 2004/0172263 A1 | 9/2004 | Prieto-Moreno Torres et al. | |
| 2004/0176134 A1 | 9/2004 | Goldthwaite et al. | |
| 2004/0187099 A1 | 9/2004 | Irwin | |
| 2004/0203583 A1 | 10/2004 | Kwan | |
| 2004/0215564 A1 | 10/2004 | Lawlor et al. | |
| 2004/0235413 A1 | 11/2004 | Min et al. | |
| 2004/0267646 A1 | 12/2004 | Chandhok | |

OTHER PUBLICATIONS

Office Action in Related U.S. Appl. No. 10/874,712 (Sep. 6, 2007).
Office Action dated Feb. 15, 2008 for U.S. Appl. No. 10/853,092.
www.wave.com/about/faq.html, "Wave FAQ," Wave Systems Corporation, printed Sep. 1, 2004.
Information Disclosure Statement dated Aug. 5, 2004 for U.S. Appl. No. 10/643,712.
Information Disclosure Statement dated Sep. 20, 2004 for U.S. Appl. No. 10/853,092.
Office Action dated Mar. 27, 2008 for U.S. Appl. No. 10/739,259.
Office Action dated Nov. 21, 2008 for U.S. Appl. No. 10/739,259.
U.S. Appl. No. 11/418,751, filed May 5, 2006; Hammond
Office Action issued against U.S. Appl. No. 11/418,751 dated Feb. 03, 2009.
Office Action issued against U.S. Appl. No. 11/418,751 dated Mar. 25, 2010.
1 Office Action dated May 12, 2010 for U.S. Appl. No. 10/853,092.
Office Action dated Sep. 18, 2009 for U.S. Appl. No. 10/853,092.
Office Action dated Mar. 25, 2010 for U.S. Appl. No. 11/418,751.
JP 9288749 Abstract, Publication Date: Nov. 4, 1997.
U.S. Appl. No. 10/739,259, filed Dec. 18, 2003.
Information Disclosure Statement dated Mar. 15, 2004 for U.S. Appl. No. 10/739,259.
Office Action dated Mar. 22, 2007 for U.S. Appl. No. 10/739,259.
Office Action dated Sep. 28, 2007 for U.S. Appl. No. 10/739,259.
U.S. Appl. No. 10/853,092, filed May 25, 2004; Irwin.
U.S. Appl. No. 10/853,092, filed May 25, 2004.
Information Disclosure Statement dated Sep. 15, 2004 for U.S. Appl. No. 10/853,092.
U.S. Appl. No. 11/044,848, filed Jan. 27, 2005; Irwin.
U.S. Appl. No. 11/044,848, filed Jan. 27, 2005.
Information Disclosure Statement dated Jan. 27, 2005 for U.S. Appl. No. 11/044,848.
Information Disclosure Statement dated Jun. 22, 2005 for U.S. Appl. No. 11/044,848.
U.S. Appl. No. 11/457,048, filed Jul. 12, 2006; Caldwell.
U.S. Appl. No. 11/457,048, filed Jul. 12, 2006.
Information Disclosure Statement filed on Jul. 28, 2006 for U.S. Appl. No. 11/457,048.
Information Disclosure Statement filed on Feb. 21, 2007 for U.S. Appl. No. 11/457,048.
*Texas Instruments*: mSAFE Texas instruments Demonstrate Innovative'Handse-Based' Method for e-Billing Applications on 2.5G and 3G Mobile Devices, Visited Feb. 25, 2003.

* cited by examiner

SYSTEM AND METHOD FOR A FLEXIBLE DEVICE-BASED RATING ENGINE

This is a non-provisional patent application which claims priority from three prior-filed provisional applications with the following serial numbers and filing dates: 60/367,964 (Mar. 27, 2002); 60/375,455 (Apr. 25, 2002); and 60/414,122 (Sep. 27, 2002). Each of those applications is hereby incorporated by reference into the current non-provisional patent application.

FIELD OF THE INVENTION

This invention is in the field of computerized billing systems.

BACKGROUND OF THE INVENTION

Single purpose computerized end devices, i.e., cell phones, pagers, personal digital assistants, etc., have become commonplace. These single purpose devices have not, in the past, included any kind of application hosting facility. This was understandable given the network and processors that were available. Any intelligence had to be found in the "hosts" that they were attached to. Often, the only way the end consumer could access the "real data" was to talk to a customer service representative (CSR) who had direct access to the host where the data resides.

Also until very recently, the environments for customer care and billing applications versus the overall carrier network environment were very different. Application environments, typically, were either Unix/Open systems-based or Microsoft-based. The wireless networks used proprietary technologies. Finally, end devices and switches used proprietary operating systems, application development languages and runtime environments. Gateways had to be created to allow special purpose data (usage records, etc.) to be moved from the proprietary operating network to the more open application networks.

More Capable Devices

Four key trends are shaping the computerized billing industry: increased processing power on user devices, longer lasting batteries for user devices, standardization of the development and operating environment on the user device (standard operating systems), and finally the demand and growth of applications executing on the user device. End devices are rapidly moving from simple, proprietary, single purpose devices to full-fledged mobile application deployment platforms. The devices are also merging as personal digital assistants become wireless enabled and cell phones extend to become personal information management devices. These advancements include several dimensions: CPUs, memory, networking, graphical displays and operating systems.

Nomadic computing is a reaction to the complexity of interaction described above. In this nomadic computing model, the system adapts to the end user so that they have access to relevant information wherever they are, independent of their access mechanism. The system understands the location of the end user (both the virtual location, such as a portal, as well as their physical location), the identity of the user (his security credentials as well as his preferences), the time of his access, and the surrounding environment in which the interaction is performed (the device capabilities, the network bandwidth, etc). The system is responsible for maintaining the overall context of the interaction even as the user migrates from access point to access point.

These forces will merge to drive the next generation of the Internet which will be known as the Supranet. But satisfying user experiences will not be made strictly by wireless access; instead, integrating all end user access into a coherent whole will make compelling interactions. This integration will cross network boundaries and allow an interaction to be initiated in one medium and consumed in another. For example, driving directions requested by phone could be delivered by email. End users will access the Supranet via a variety of mechanisms: personal computers, phones, hand held devices, cameras, music players, game consoles, cars, public facilities such as kiosks.

Referring to FIG. 5, this includes a transition from a "one-to-many" model (client-server model) to a "many-to-many" model where interactions are becoming more direct between individual users. This model is termed Peer to Peer (P2P) and will trigger a swing from centralized web applications to more distributed ones exploiting resources at the edge of the network.

There are several examples of these applications: Napster, ICQ, Popular Power, Freenet, AIMster, and Groove. What all of these have in common is that they are all leveraging previously unused resources by tolerating and even working with the variable connectivity of the hundreds of millions of devices that have been connected to the edge of the Internet.
The Current Model As technology advances, so must the billing and customer care applications which support service offerings/content access on the end-device. Customer care and billing applications (including pre-paid applications) have generally followed a network-centric or server-centric processing model. Please see, U.S. Pat. No. 6,198,915 by Russo, which issued on Mar. 6, 2001. Network-centric models process and store information centrally in the network and not in the device or access point that generates the data or events. Customer data is housed on centralized databases. Rating and billing for events involves some sort of network activity or usage. The model for rating and billing is to pull events from essentially dumb devices/networks to a central location where business logic can be applied to determine and apply tariffs. This information is then sent back across the network to users or other systems.

The timing of these calculations can vary greatly from a few minutes to once a month depending on the particular billing system. What is common is that the billing is done not where the activity takes place but centrally and not when the activity is occurring but after some interval.

Even where some processing functionality takes place on an end device, please see, U.S. Pat. No. 5,577,100 by McGregor, which issued on Nov. 19, 1996 and U.S. Pat. No. 6,198,915 by Russo, which issued on Mar. 6, 2001, such applications are marked by a server-controlled relationship and are very limited in the scope of functionality offered on the end device.

SUMMARY OF THE INVENTION

Various embodiments (including systems and methods) for a flexible device-based rating Engine are disclosed. These embodiments may employ one or more of the following features disclosed herein either singly or in combination. These embodiments may facilitate the emerging technologies discussed in the background above, as well as technologies yet to come. The device-based rating Engine comprises a computerized application which facilities the configuration of computerized metering, rating, billing and managing of account balances on an end computing device whether the device is connected to a network or not connected to a network. It also facilitates the allocation of the metering, rating, billing, and managing of account balances between the end device and other peers, including a centralized system. The device-based rating Engine may be incorporated into virtually any end device that is capable of hosting the application.

A computerized system for processing events wherein said computerized system comprises an end device and said end device comprises a computerized Engine configured to process an event wherein said end device may process said event entirely within said computerized Engine and under the direction of said computerized Engine. Events may be generated by the consumption of content, games, network and device based services, voice transactions and more The computerized Engine may further communicate with a computerized digital rights management (DRM) module to effect certain authorization and validation functions for the events. The DRM may also be contained entirely within the end device.

The computerized Engine also initiates communications with a centralized system via a network to interact with a back end billing system that handles aggregation, cross device discounts, shared resource utilization (minutes, downloads, etc), fraud detection and settlement requests generated by the computerized Engine.

The computerized Engine may also maintain an account balance for a user associated with the end device. The account balance may be stored entirely within the end device and may be manipulated by the computerized Engine in response to an event promulgated by said user.

The computerized Engine may further initiate communications with a payment agent (Visa or other crediting or debiting entity) wherein the account balance stored within the end device may be replenished when the account balance satisfies a controlling business rule such as when a balance reaches a predetermined limit.

The computerized Engine may be deployed over the following embodiments: end device's hardware, end device's firmware, end device's operating system, and/or an application level deployment within said end device. Components of the computerized Engine may be distributed over one or more of these deployments as well.

Finally, the computerized Engine may achieve the following benefits:

Scalability—As with other peer-to-peer systems, the overall system scales with the number of devices because each device comes with its own processing power. The system automatically adjusts to increases in the number of devices because each device brings its own CPU and rating instance.

Network Bandwidth—The DRE improves network utilization because network traffic is not incurred for every transaction. Information can actually be bundled in this model. In a network-based system all the data required for rating needs to be transmitted. In a DRE system when the data needs to be transmitted for record keeping, etc, all the data needed for rating does not need to be transmitted because the records are rated on the device. In prepay instances the savings can even be greater. Normally in prepay with a network client server model a lot of authorization messages need to be transmitted. When the device may be maintaining the balance, these messages are not required. Also in a prepay model, a user may need to be informed of rating limits while activity may be occurring. For example, in a prepay voice call, the user is sometimes informed of minutes used or balances via a whisper. In network systems, this involves network traffic and the use of special network equipment. Neither this type of traffic nor the specialized equipment for such traffic is required for various embodiments of the invention.

Lower Deployment Costs—Because the rating function may be distributed out across the processors of the devices there may be no need for large centralized computing resources specifically dedicated to rating. While some form of backend system may be required for administration and for processing cross device discounts, promotions, fraud detection, etc. there may be no need for large server farms dedicated to rating and billing. This may be especially true in a prepay model.

Easier Customer Support—The device may support real time on device rate determination. It may also support, via the storage facility, a journal or record of activity. The end user (with the appropriate UI) may actually see this information. This allows them in many instances to answer many of their billing questions directly themselves on the device in real time. This should result in significant savings in the cost of back-office, customer-service agents. Today many calls made to such agents are for access to the information that only the agent has access to because of the client/server model of the billing system. In this embodiment, the end user has direct access to the information because it may be happening directly on his device.

Content Billing—Most of today's networks are packet-based. At the network level, content transmission is simply a series of packets. Voice may be intermixed with video, file sharing, application requests, etc. The network in many instances does not understand the particular content it may be transmitting. This independence is one of the real powers of today's packet-based network, but it makes billing for content more difficult. Billing at the device, however, solves this problem because the device (the applications) knows what content is being consumed. This allows for the application context to be included in the rating and a large factor here may be the content itself. This may be extremely important as billing moves away from just billing for packets or time and actually billing for content.

Network Independence—A device-based rating system can be independent of the network it may be connected to. It can rate in a network agnostic fashion. For network usage type services, the DRE can support a complete range of network protocols (2G, 2.5G, 3G. 802.11, BlueTooth, Infrared, etc).

Real Time Metering—Rating on the device can be done in real time as content or services are being used. This allows very fine grain control of pricing and content utilization. It also allows for real time display to the end user of specific charges for specific use.

Rating while off Network—Many types of content can be consumed while a device may not be connected to a network: games, music, software, etc. All of this digital content can be consumed independent of any network connection.

In one embodiment, the invention comprises a computerized system for processing events (including but not limited to content consumption events and/or transaction events) wherein said computerized system comprises an end device and a host system wherein said end device comprises an Engine configured to process an event. The Engine further is configured to receive an event for processing and to process said event while disconnected from a host system (any backend system connected to a network that is accessible by the Engine). The Engine is further configured to selectively establish a communication link (physical or logical connection) with said host system to synchronize with said host system. The host system may comprise one or more of the following: billing system, settlement agent, rating Engine, and/or content provider system. Synchronization means a matching up of the two systems being synchronized so that they comprise mirror images in the areas to which the process was applied. Synchronization may include, but is not limited to, the following: one or more account balances, one or more rated or unrated usage records, one or more price plans, one or more payment classifications, and/or one or more credit policies.

In another embodiment, the Engine may be capable of connecting to a network and transmitting a limited inquiry to determine the level of traffic present on the network and, using this information, selectively choose to establish a connection to a host system on that network if the level of traffic is within a set of predetermined boundaries. Selective establishment of connection to the host processor may also be based on the level of activity on the end device, a predetermined schedule, when a particular type of event is processed or when a certain number of records have been processed.

In some embodiments, the Engine may begin processing of the event but more complicated processing may be required or some other reason may exist to complete processing on the host system. The Engine is configured to split processing responsibility between the end device and the host system where desired. In an alternative embodiment, the Engine may send the event to a third party provider for further specialized processing. For instance, a third party provider may provide a rebate for the purchase of a particular item but it needs to be notified of the purchase before it can send a rebate event to the Engine.

An advantage to a device-based rating Engine is the end device's ability to determine, in a content-based operation, the type of content that it is actually consuming. Rating plans may be built around content types rather than merely time or byte based and the Engine may be designed to select the proper algorithm for the proper event.

All events that the Engine processes are stored/summarized in an on-device journal that may be accessed by a user of the end device through a user interface (preferably a GUI).

In another embodiment, the invention comprises a computerized system for processing events wherein said computerized system comprises a first end device and at least one additional end device wherein said first and said at least one additional end device each comprise an Engine configured to independently process at least one event; wherein said Engine of said first end device may selectively establish a communication link with said at least one additional end device to synchronize one or more events processed on said at least one additional end device with said first end device. The first end device may maintain a master balance to be utilized by said Engine to settle a cost associated with said event. The master balance may be earmarked among one or more providers or even for particular events. The master balance may also be reallocated upon the request of one of the additional end devices to the first end device. This may be according to a predetermined formula or it may be calculated based on a history of events processed on the devices which are to share in the reallocated balance. The formula may also take into account other information such as preferred customer status, credit status, etc.

End devices may comprise a spectrum of technologies and two end devices comprising Engines for processing events do not necessarily have to be of the same type (e.g., one may be a cell phone and the other may be personal digital assistant). Nonetheless, these different devices may be assigned to the same plan for processing events and share algorithms, balance totals, etc.

Finally, in another embodiment of the invention third party applications may reside on the end device and interface with the Engine through a set of publicly available application program interfaces. By way of example and not limitation, one such interface may be designed to accept/receive events from third party application programs. Another interface may be designed to accept/receive queries from a third party application as to the status of a particular event. Using the application program interfaces, a third party application may be configured to produce an event, which is specialized according to the parameters of that third party application. A similar API could be used by a DRM platform for DRM integration.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers.

DETAILED DESCRIPTION OF THE EMBODIMENTS

Figure 1:
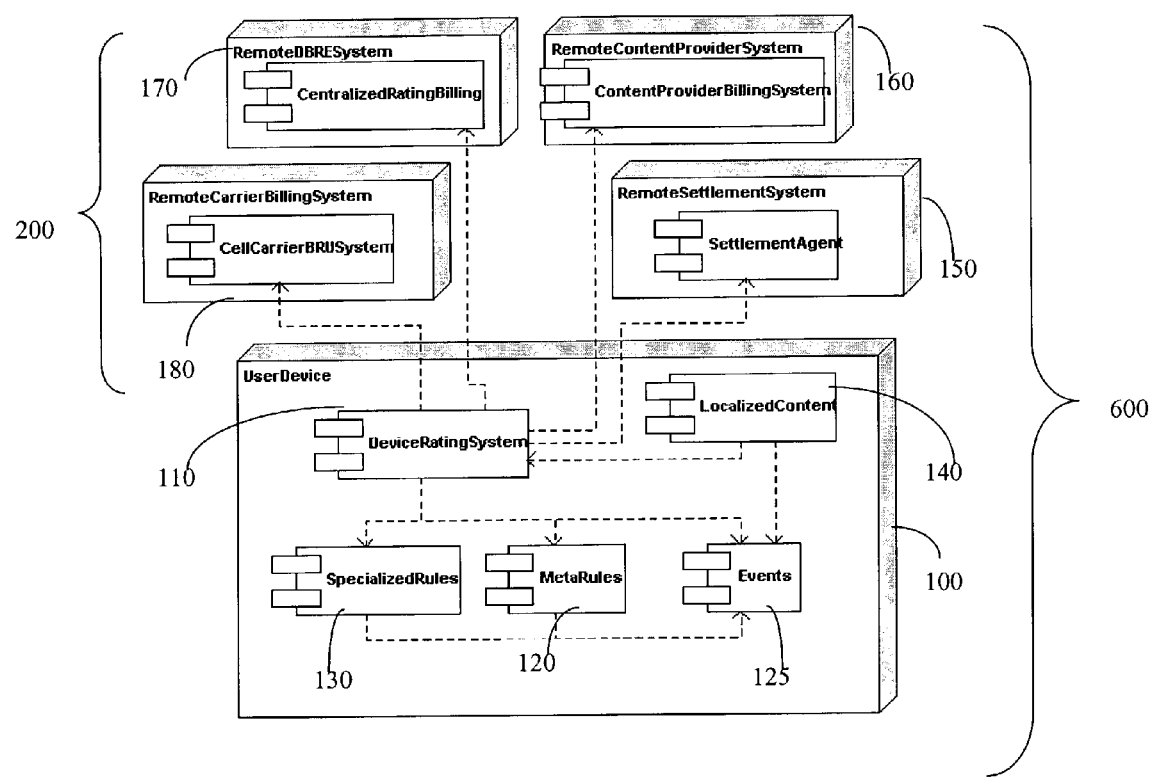
FIG. 1 depicts some of the major dependencies between the core components within one embodiment of the proposed system.

This application discusses a different perspective on the problem of metering, rating, billing and managing account balances by performing some or all of the functionality in the device itself as an alternative to the traditional, centralized model. Embodiments of the invention include a conceptual and detailed design for a Device Based Rating Engine (various embodiments shall be collectively referred to as DRE or Engine). The terms Engine/application/program as used herein will refer to any embodiment of computer-executable instructions on a computer readable medium including but not limited to software, hardware, firmware, modules, programs, routines, etc.

The programs described herein are presented according to principles of object-oriented design, the terms and concepts inherent to this model will be easily understood by those of skill in the art; however, it should be understood that other programming methodologies would work as well.

Device-Based Rating

The DRE may comprise a general-purpose rating and billing Engine hosted on a wide variety of end devices which may not be specific to any industry. The DRE processes transaction events, which should be understood to refer to an activity performed by a user via use of the end device which are capable of being measured, billed or authorized, and content consumption events (e.g., download or read a book, open a WebPage, check a stock portfolio, etc.) which are a specific type of transaction event, as that term is defined above. The end device may comprise any device capable of hosting content or offering a meterable service. The end device may be fixed or mobile, distributed or centralized (i.e., where a server itself may be actually consuming content or engaging in a transaction event as opposed to merely delivering content to a client system.) Content may even be stored and consumed later on the end-device when the end-device is off-network. Preferably, some, at least periodic (scheduled), intermittent (random), or occasional (user-initiated), connection to a network may be available. The following list of potential end devices is meant to be explanatory rather than limiting: mobile devices, pagers, cell phones, PDAs, laptops, desktops, game consoles, set-top boxes, appliances such as televisions and washing machines, services, personal computers, stereos, walkmen, MP3 players, DVD player (handheld or otherwise), vending machines, rental equipment and more.

As a rating system, the DRE may calculate a price for some actual or potential occurrence by considering factors such as the date and time of an occurrence, length of time of an occurrence, some dimension or size of an occurrence (such as number of bytes in a download), history of past occurrences, or some quality of the occurrence (sound fidelity, resolution of video, etc.). In past attempts to tailor calculation of charges to specific factors, attempts have been made to attach markers to the bytes or packets being transmitted over the network that designate the download as voice, e-mail or music so that the network could assess the transmission according to that code. The reality, however, may be that these elements are intermixed and that the network in many instances does not understand the particular content it may be transmitting (the network perspective is the bytes or packets downloaded). The end device, however, does understand what it is consuming and is in the best position to know exactly of what type, when, and how much of the content was actually consumed and then use information about application context to calculate the charges associated with such consumption.

Another possible billing model that may be further enabled with the DRE is recognition of its geographic location and the ability to consume location-based services that are in turn rated and billed for on the device.

The DRE may also include real time metering and fraud detection using the device's rating system to meter the use of the content in real time and ensure that the requirement for sufficient funds may be enforced directly at the point of consumption thus reducing fraud.

DRE (110) may be implemented on the user device (100). Various remote systems (150-180) are provided as examples of potential external interactions with other systems. Referring to FIG. 1, specific interactions are dependent on the implementations of the collectors and rules (120, 130) that process any given event (125). These may include managing an account on the DRE, generating rated usage on the DRE, managing a balance on the DRE, applying cross-device discounts, applying credit policies, mediating, settling and more.

Events (125) may comprise occurrences of external actions reported to the DRE (110) to cause some effect. Events (125) may be produced by external applications and consumed by the DRE (110) or forwarded to a remote system. Events may be categorized by type for generic processing or specialized for specific processing.

In an embodiment of the invention, the DRE is autonomous. The end device is in control, that is, the end device initiates communications with a back-end system to the extent that the end devices interfaces with a back-end system (e.g., to synchronize charges, events, or to download new rating schemes, data from external databases, and new algorithms for rating, encoding, encryption, etc) according to predetermined or programmable triggering points (e.g., a specific number of events, on a timer with an error check to make sure there are events to report before initiating the communication, etc.). In various embodiments, the end device is no longer a slave to inquiries by a central rating and billing system. This feature embodies the paradigm shift from the old "server-centric model" to a "distributed model" in which the end devices control the processing of events/transactions and the consumption of content. This improves traffic flow over the network because unnecessary traffic is not created by a centralized rating and billing system to update rules/algorithms/tables when such may not be utilized by the end device. In one embodiment, since the device handles rating, there isn't any need to handle all of the usage/authorization records that are moved around the network today. Furthermore, bandwidth may not be utilized for fruitless, automated polling queries by the centralized rating and billing system—the device may simply upload records when such records exist or a predetermined amount of records has been accumulated. Finally, the end device may choose the most appropriate time (through analysis of its current processing power consumption and/or analysis of current network throughput) to upload events to the centralized rating and billing system to achieve the most efficient transfer possible.

The DRE may take advantage of common operating environments available on the next generation set of hand-held and wireless devices (including but not limited to J2ME enabled devices, Palm devices, Symbian devices, Microsoft CE-based devices, and equivalents therefor). The DRE may be a host application on the device; it may use the common operating environment on the device for its processing, networking, display, timing, event notification and storage. It may provide its services to other device-hosted applications that require rating and authorization for access and content. This may be provided through the common application interface mechanisms provided by the DRE's operating system.

Scaling also takes on a different dynamic with a device-based solution. In a sense with a device-based model every subscriber shows up with his or her own CPU. Because the processing is distributed, the system scales evenly with the addition of new subscribers. It is a self-regulating system.

For purposes of scalability, various embodiments may utilize threading. A thread allows multiple paths of execution, e.g. simultaneous execution of event processing, network connections, etc. An instance of the DRE handles multiple concurrent 'events' or service requests. Each event can be assigned to a pre-allocated thread (from a pool) that processes the 'event'. If multiple instances of event processing or network connection handling are using the program or concurrent requests from other programs occur, a thread is created and maintained for each of them.

Various embodiments of the invention propose to solve individually or in combination the current rating dilemmas:
  Gaming that occurs on a device while disconnected from the network;
  Music/Movie consumption that may be stored on the device;
  Digital Content offered and consumed over a Peer-to-Peer network (Napster-like service);
  A commercial transaction occurring via a Peer-to-Peer application networking running over WLAN connection. This could be between a vending machine and a PDA or a public kiosk;
  A local e-wallet debit that occurs directly in a device for the above transaction;
  Ad-hoc collaboration session that occurs on a Peer-to-Peer network; and
  Roaming over several dissimilar networks.
  Metering the use of alternative, foreign networks for recouping equipment subsidies.

The DRE (110) is a very flexible system where the amount of rating and billing processing can be shifted between a single device, a set of devices, remote provider systems or a centralized system. An embodiment of a DRE (110) may fit within an overall system (600) for billing, rating, administration, and customer care. In another embodiment a peer-to-peer model for rating, billing, and settlement may be accomplished by distributing the processing out to the devices (100) themselves. Another embodiment may allow network involvement in an end-device system that provides local rating and billing but cooperates with a back end billing system that handles aggregation, cross device discounts, shared resource utilization (minutes, downloads, etc), fraud detection, settlement, etc. Virtually any combination of the aforementioned functionalities may be created.

The amount and kind of processing performed in the end device can be tailored to the individual application executing on that specific device. Thus, the DRE can perform processing (including metering, rating and billing) for many applications on a single device even though each application may have its own unique requirements for processing.

Figure 18:
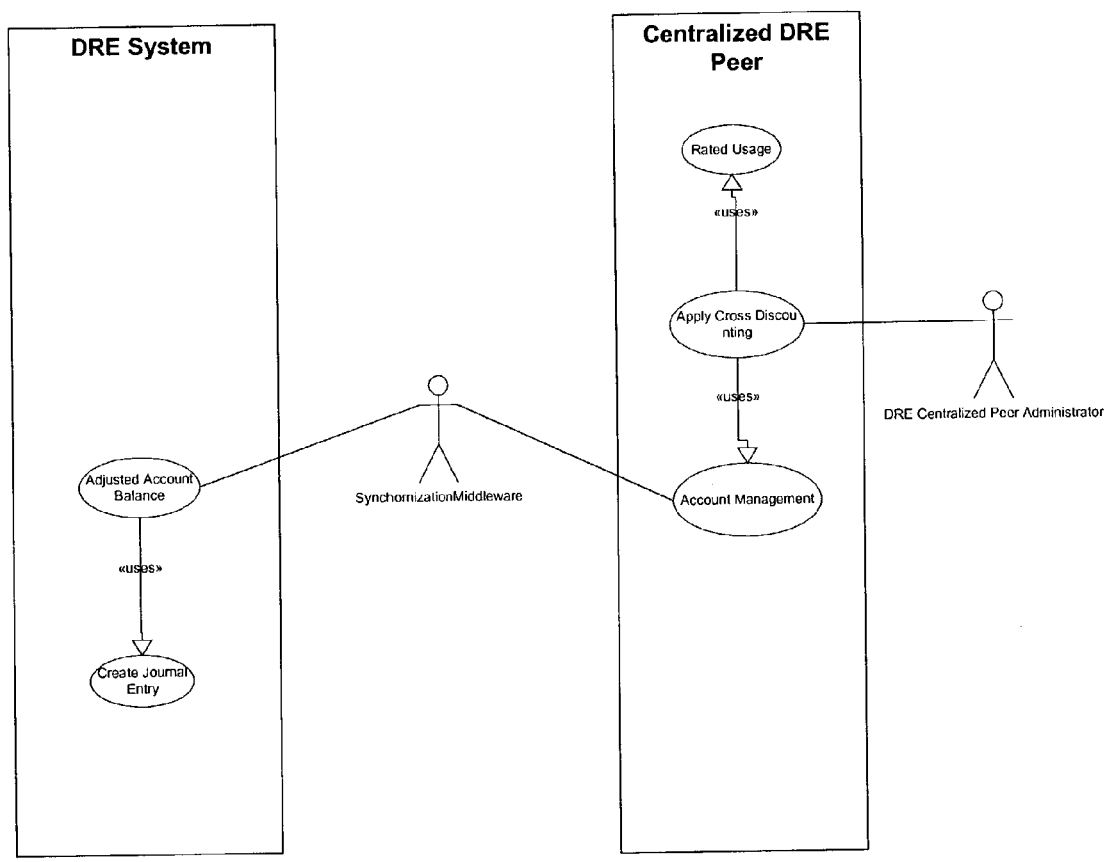
FIG. 18 illustrates a model in which usage rated on the DRE may have cross-device discounting applied at the centralized DRE peer.
Figure 19:
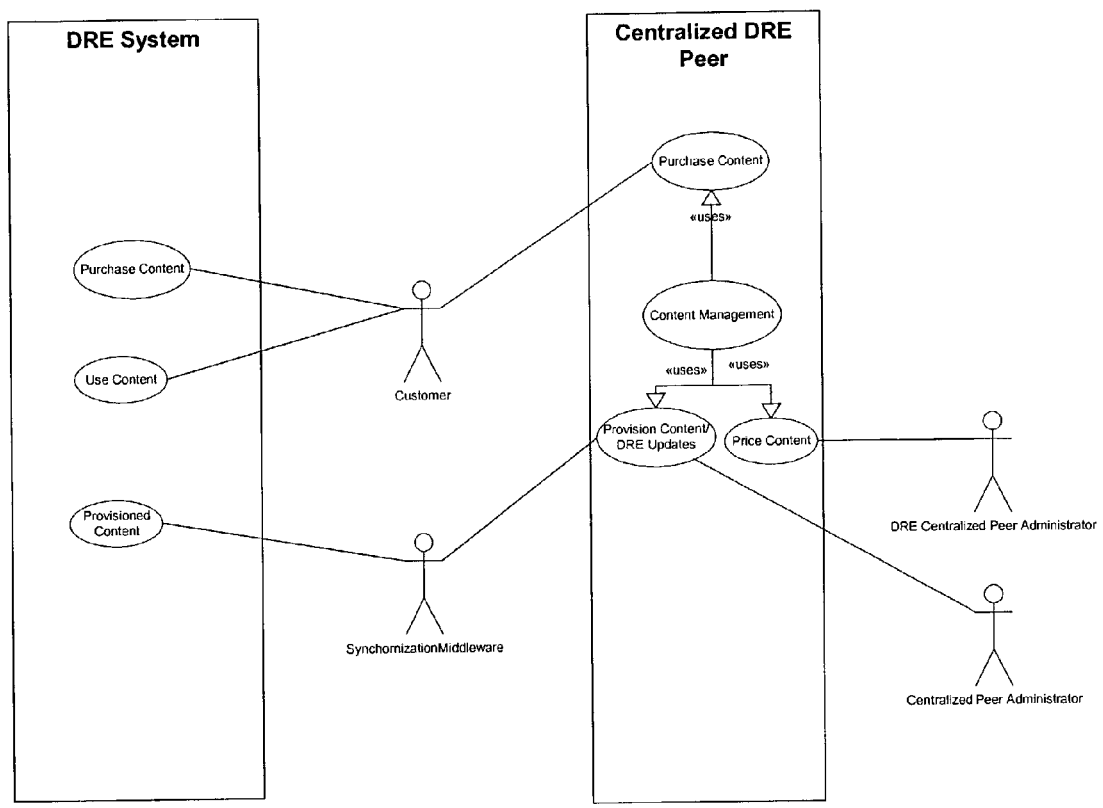
FIG. 19 illustrates a model in which a Centralized DRE peer may also be a content manager and how synchronization middleware facilitates the provisioning of such content on the DRE.

A central rating and billing system (174) can collaborate with the distributed DRE system (110) to produce the final bill for the customer. The DRE (110) can provide varying degrees of rating and summarization of events occurring on the device and send those onto the centralized system (174). Referring to FIG. 18, the rated usage (1820) may be periodically synchronized with enterprise settlement peers (1460). These enterprise peers (1460) can provide subscriptions for services and content to DRE customers (1410). These enterprises (1460) may choose to offer cross promotional or discounted offerings to subscribers (1410) with DRE (110) enabled devices (100) based on rated usage (1820) information acquired from DRE (110) enabled customers (1410). Some example promotions are holiday discounts on content and services, as well as extra credit for high game scores on a DRE-rated game used by customers (1410) of the enterprise peer (1460). Also, the rated usage can be used by the enterprise (1460) to analyze content and service usage patterns.

Figure 6:
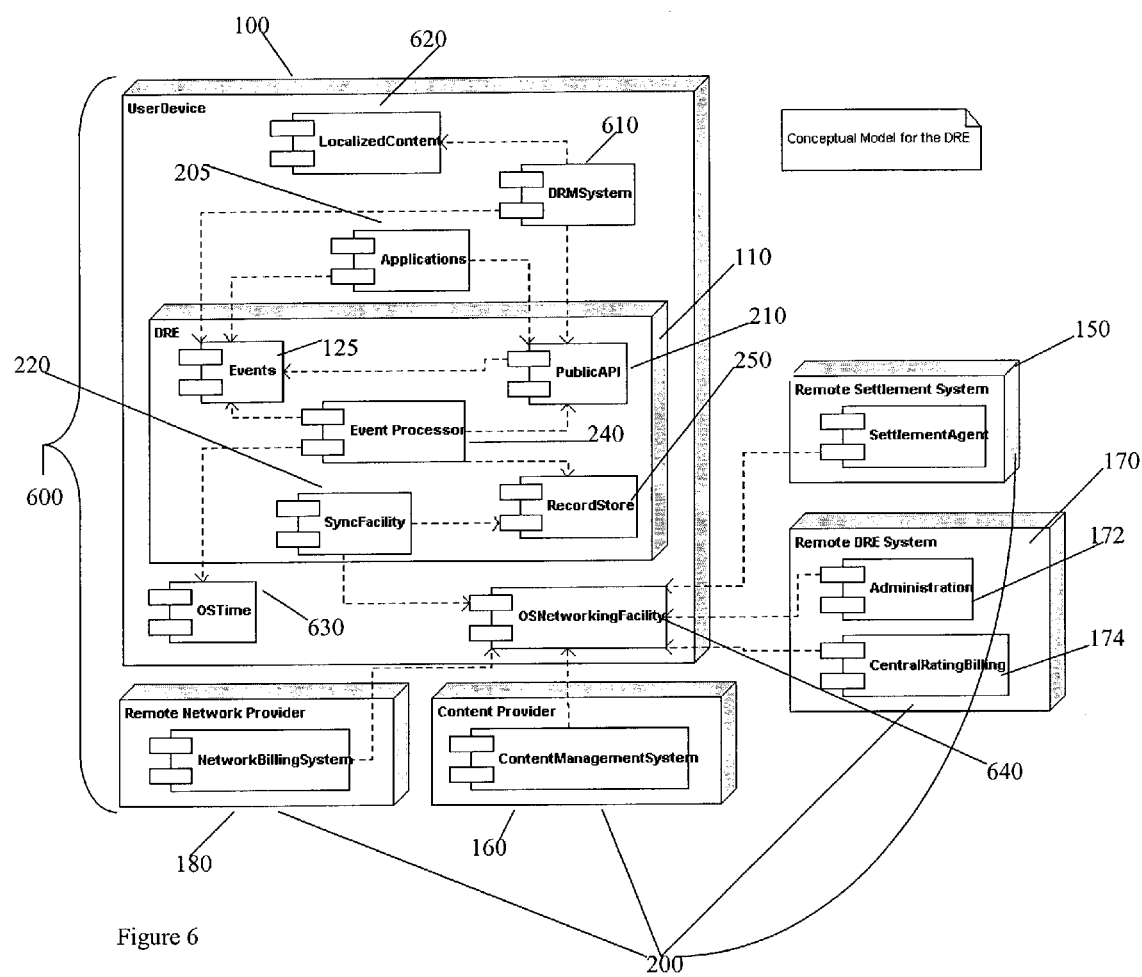
FIG. 6 illustrates the various components of one embodiment of a device-based rating system.

Referring to FIG. 6, a Record Store (620) may provide a facility to hold the data about price plans as well as usage history. This store (620) may sit on top of the standard storage API provided by the operating system or execution environment.

High Level Design

The DRE model may be particularly suited toward a pre-paid model where the balance persists even when the consumer may be out of range of the network. This disconnected mode may occur by environment (inside a building, elevator, or tunnel), regulation (airplane), or choice (power-saving mode). Also, in the prepaid model, a platform may be designed to deal with micro-payments which are currently associated with high processing and transmission costs.

Rating may also be performed continuously or simultaneously as an occurrence may be underway. It may not be necessary for rating to happen after the fact. In a preferred embodiment, rate plans may be configurable and modifiable at runtime. They may be managed in a central location and then downloaded to the DRE upon initiation by the DRE via a synchronization program.

Referring to FIGS. 1 and 6, the end-device (100) may include a DRE further comprising a generic "event-based" rating Engine (110). The DRE (110) may be configured with a set of generic "collectors" that capture the events and process them by analyzing the attributes of an event and, when a match occurs, launching an associated rule (120-130). The generic collectors may provide a set of standard billing and rating services. Generic collectors may use meta-rules (instructions derived through data) (120) to process generic events (125). Specialized collectors with specialized rules (130) may be added to the DRE (possibly through customized development) (110) configuration to capture specific events and process them with specialized business rules (130). Collectors and rules may be managed in a central location and then downloaded to the DRE upon initiation by the DRE via a synchronization program. Rules may comprise rate plans, rating algorithms, and/or payment algorithms.

The DRE (110) may collaborate with remote systems in a modified version of the traditional client/server model. A centralized rating and billing (CRB) component/peer (170) may facilitate the configuration and maintenance of the collectors, rules, and known events. The other remote systems (150-180) may collaborate with the DRE (110) to process events (125). The CRB (170) may also serve as a mediator between other remote systems (150-180). Events (125) may be passed from the DRE (110), to the CRB (170), which may then collaborate with another system based on its specific interfaces and protocols.

The DRE (110) may maintain on the device (100) a set of account balances that can be debited, credited and queried as necessary based on the rating and/or consumption of events (125) in either connected or disconnected mode. The balance may be expressed as units, which can represent any type of measure (i.e., dollars, time, tokens, megabytes), or as a specific type of measure. The balance may also be stored in generic "units" and the rating program may comprise a translation mechanism to convert units into the appropriate unit of measure necessary to facilitate an event. An account balance may be maintained in a generalized account used to settle any event (125) authorized to draw from that account. The balance may also be maintained in a specialized account associated with a limited set of events (125) specific for that account balance.

Figure 13:
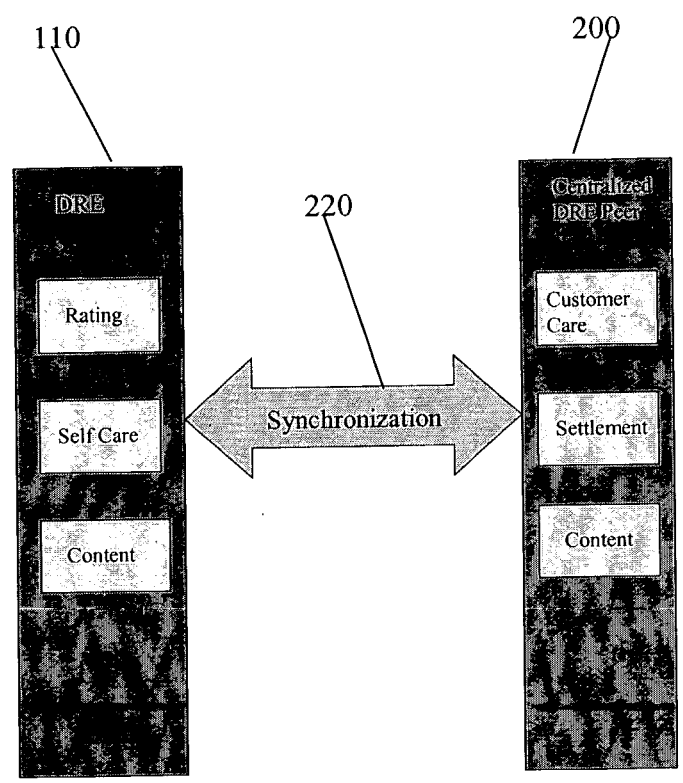
FIG. 13 illustrates a high-level service view of a DRE and a centralized DRE peer.

Referring to FIG. 13, there is shown a high-level service view of a DRE (110) and a centralized DRE peer (200) and the division of duties thereon. A DRE (110) may be capable of managing and maintaining account and account balances on a device (100) utilizing the hardware and software security. The on-board account and balance management can either be maintained by the DRE account management module or it can integrate with a standardized, vendor specific or generic e-wallet management system. The DRE account and balance activity may be periodically synchronized (220) with the appropriate primary settlement peer (200). DRE account management can and will occur when the device may not be connected to the network, but periodic synchronization to the peer may occur for account auditing and other possible centralized account management functions.

Balances may also be shared across systems whether like or dissimilar. For example, a balance of game tokens may be shared across two gaming devices that are each held by two family members. In another embodiment, a balance of units for the mother's mobile phone may be combined and redistributed with the balance of game tokens on her son's gaming device.

An end user may also establish an account balance on the end device (100) that can only be used to settle with a specific provider.

Low-Level Design

Centralized telecommunications carrier billing, rating and usage (BRU) (180) systems typically process every phone usage record generated by the phone switch. In order to provide certain billing features, these huge amounts of usage records must be processed in near real-time. The DRE (110) may provide two critical services to assist the carrier's BRU (180): usage summarization and service authorization. The DRE (110) may accumulate usage details and present them to the BRU (180) in a summarized format to compress the amount of usage records required by the BRU (180). Additionally, the DRE (110) may authenticate services based on information stored and/or accumulated on the device such as remaining prepaid minutes.

Once the DRE (110) has rated and billed for some service, the DRE (110) may collaborate with a Settlement Agent (150) for payment. For example, a prepay arrangement might be established that when an account drops below a given threshold a debit may be issued with Visa. Upon successful interaction with the settlement agent (150), Visa in this case, additional prepaid credits may be stored on the device (100). Based on credit worthiness, a balance could also go negative (i.e., extend credit to the device up to 20 units.)

The Sync facility (220) may provide the messaging infrastructure to synchronize the device (150) status with the back-end system. Like the Record store (620) it may ride on top of the standard system level services provided by the operating system or execution environment. It may or may not be tied to any particular protocol. Messaging in this design is always initiated and controlled from the device (100).

Figure 17:
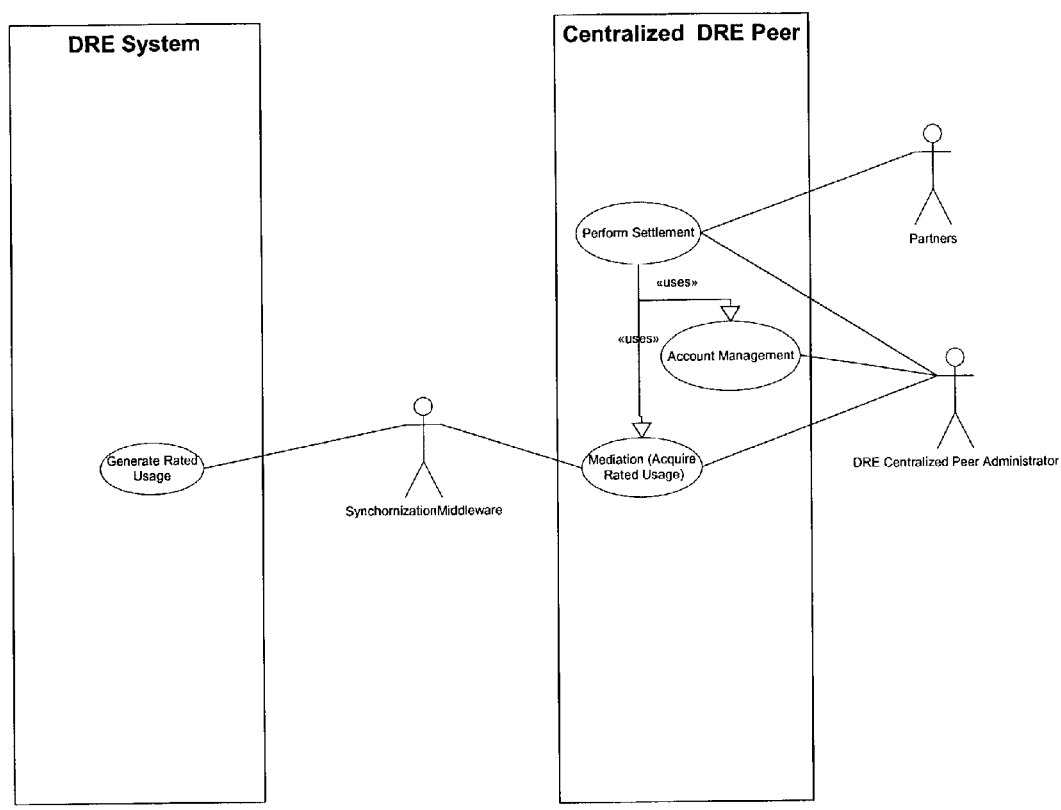
FIG. 17 illustrates a model in which usage rated on the DRE may be settled at the centralized DRE peer.
Figure 20:
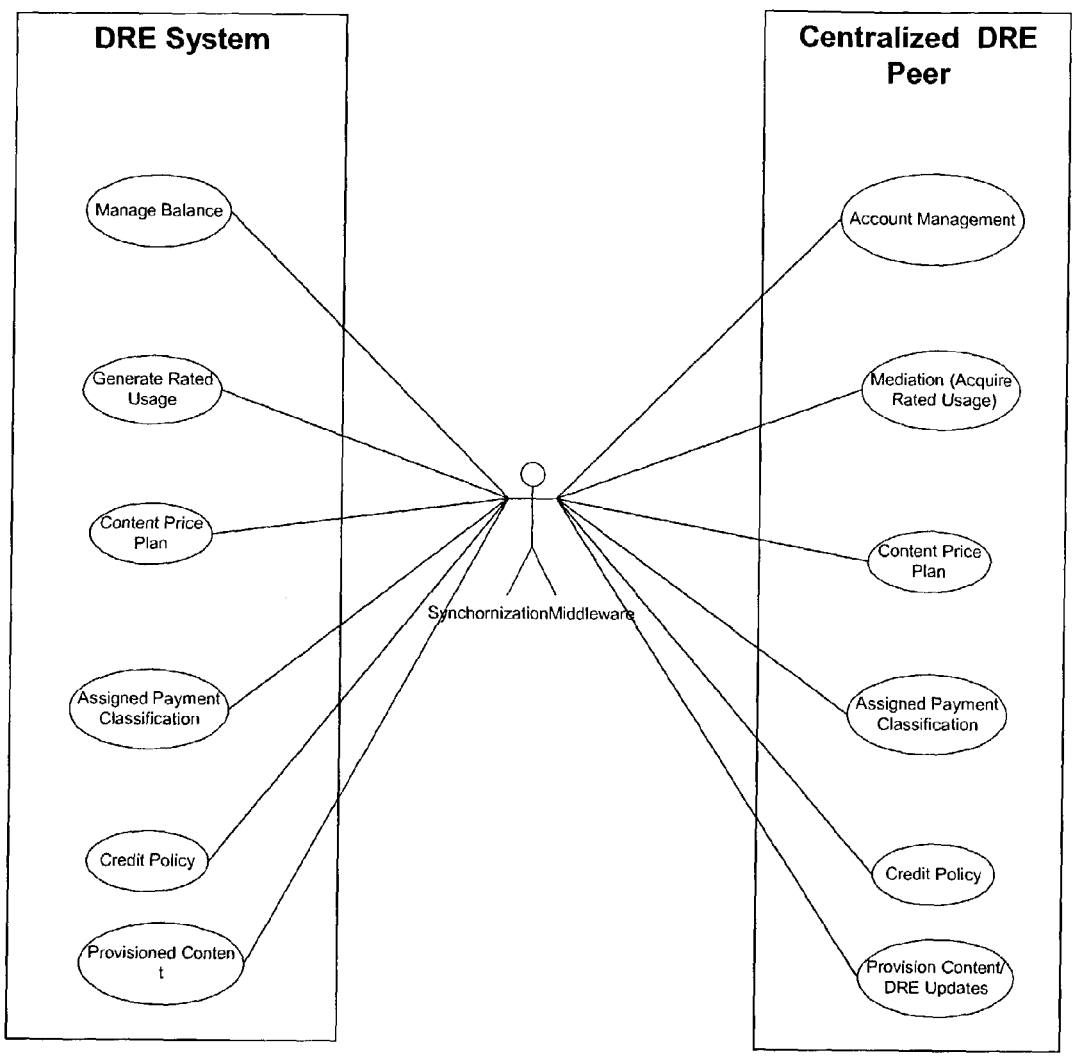
FIG. 20 displays one embodiment of possible synchronizations between the DRE and the Centralized DRE peer.
Figure 21:
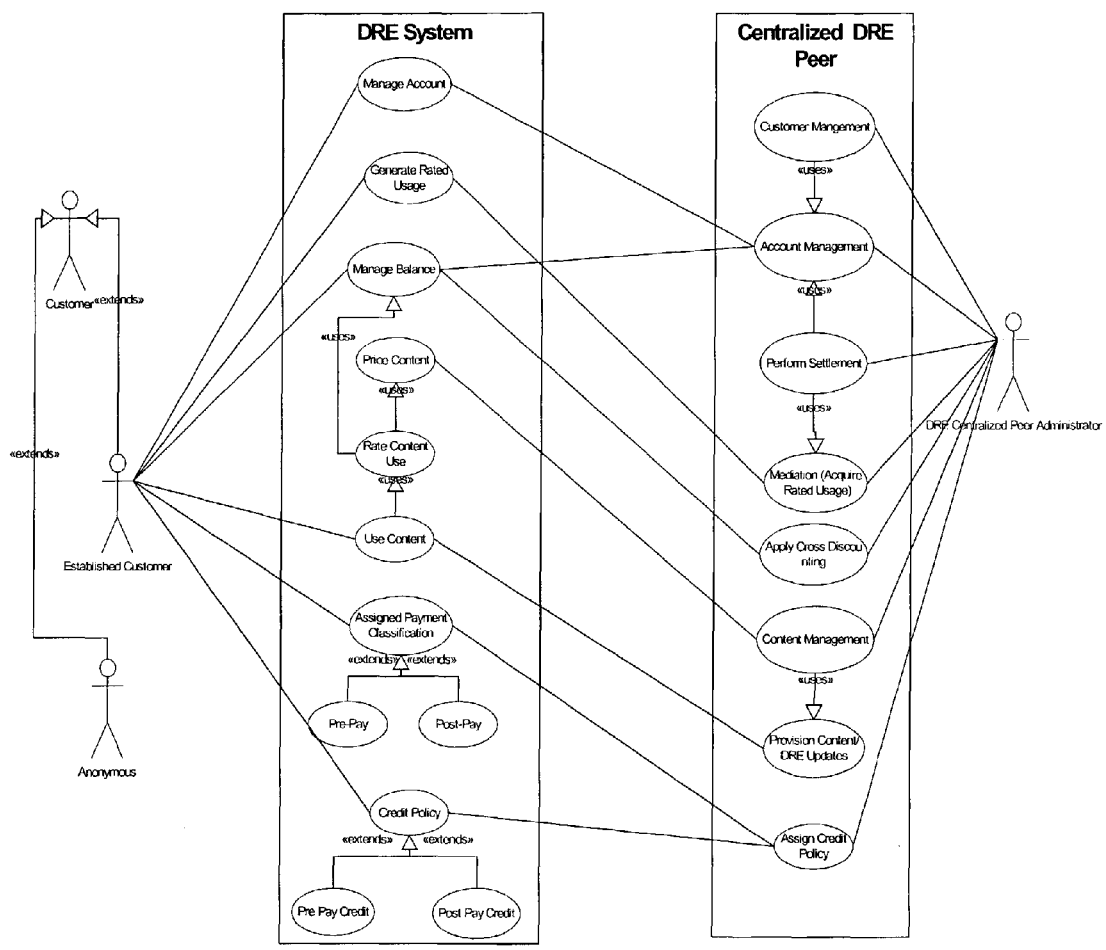
FIG. 21 displays an embodiment of possible interactions between the DRE and a centralized DRE Peer.

Referring to FIG. 17, once the rated usage information from the DRE (110) is at a recognized settlement peer (1460), settlement activities may be performed by the peer on behalf of the content and service provider partners (1710). Synchronization policies may be defined by any of the following DRE stakeholders: device manufacturers that provide an embedded DRE, enterprise device providers, content providers, service providers. The following policies may also be defined: periodic synchronization based on a timer, network sense synchronization (whenever a device starts a network connection), application initiated synchronization (either prior or after an application or service may be initiated), and device user initiated synchronization (whenever a user manually issues a synchronization). Referring to FIG. 20, virtually any aspect of the DRE (110) may be synchronized with a back-end peer including but not limited to account balance, generated/rated usage (mediation), price plans, payment classification, credit policies, content provisioning, and DRE updates.

Figure 3:
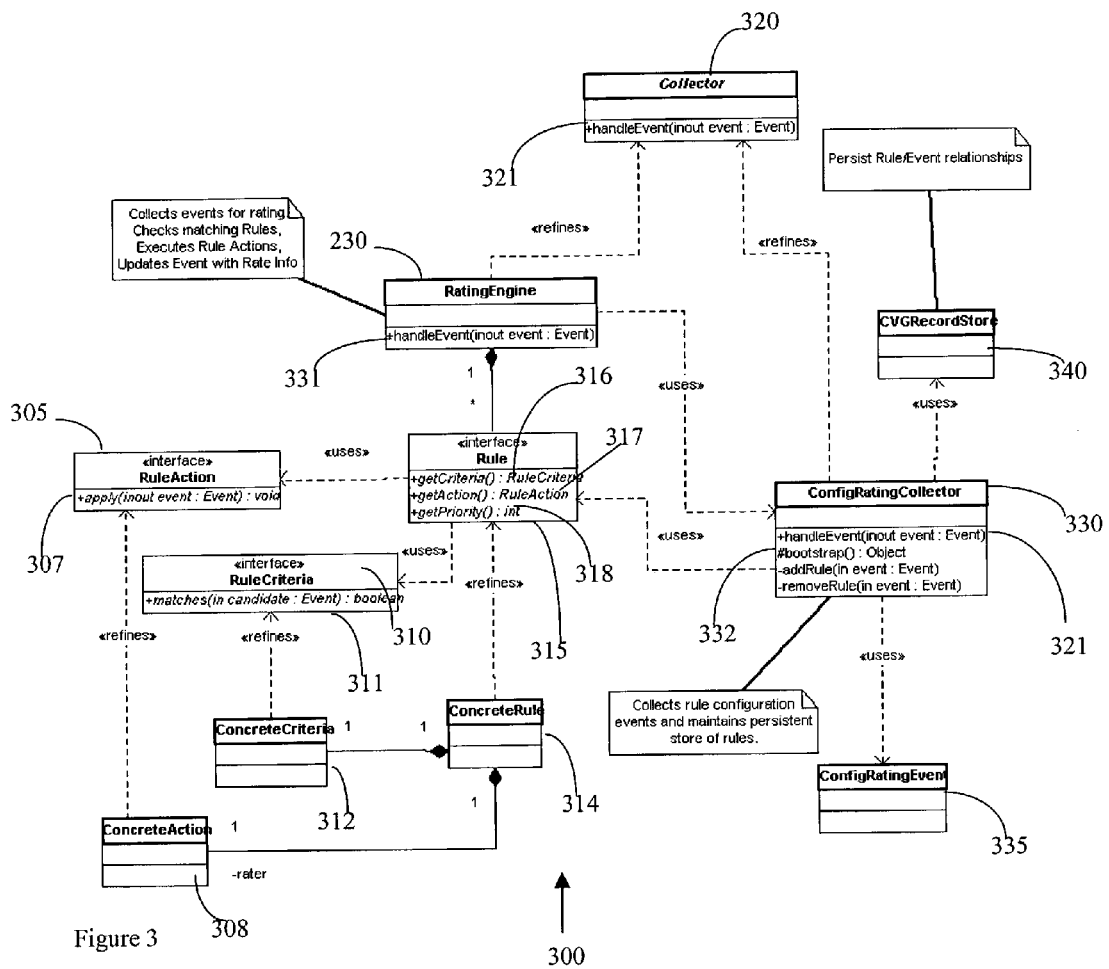
FIG. 3 illustrates an embodiment of the rules design and the integration with the rating Engine.

Referring to FIG. 3, an embodiment detailing one example of the rules design and the integration of the rating Engine component with the DRE (110) is shown. A Collector class comprises a Rating Engine class and a ConfigRatingCollector class. The RatingEngine includes the subclasses Rule which further includes RuleAction and RuleCriteria. Further subclasses include ConcreteAction, ConcreteCriteria and ConcreteRule. The ConfigRatingCollector consumes ConfigRatingEvent objects and uses the CVG Record Store.

A RuleAction Interface (305) defines the method 'apply' (307) which may be used to perform the behavior associated with the rule. The apply method (307) accepts an Event object, which may be modified during the action processing. A ConcreteAction (308) implements the RuleAction (305).

The Collector abstract class (320) contains methods to manage the Collectors configured within the system, as well as define the "handleEvent" method (321) used by all subclasses to process the Event. The subclasses of the Collector abstract class (320) will implement the required behavior to process their specific Event types (RatingEngine for rating events and ConfigRatingCollector for configuration events).

The RatingEngine (230) may be a standard Collector (320) that may be configured to consume Events (125) that should be rated. The RatingEngine (230) may obtain a list of Rules from the ConfigRatingCollector (330) either remotely or by calling the "bootstrap" method (332). When an Event (125) may be passed to the RatingEngine (230), it tests the applicability of each Rule by using the associated RuleCriteria (310) class. If the Rule may be applicable to the Event (125) passed, the associated RuleAction may be executed against the Event. The RuleCriteria Interface (310) defines the method "matches" (311) which may be used to determine if an associated RuleAction (305) should be applied to the Event passed on the method call. A ConcreteCriteria (312) class provides an implementation of the interface and performs the test. Based on a Boolean result, the RuleAction (305) may be executed.

Rule Interface (315) defines three methods for managing the collection of RuleActions (305) and RuleCriterias (310). The methods "getAction" (317) and "getCriteria" (316) are used to obtain the two associated concrete implementations. The method "getPriority" (318) may be used to order a sequence of Rules that should be performed against an Event type. The priority becomes important when multiple Rules can be applied to a specific Event. A ConcreteRule class (314) provides the implementation of the interface.

The ConfigRatingCollector (330) class refines the Collector abstract class (320) and provides the behavior to consume ConfigRatingEvent objects. ConfigRatingEvent objects (335) are used to add, remove, and update rating rules in a persistent store (340). The store (340) maintains the rules past the life span of the RatingEngine (230) instance (i.e., the device (100) may be turned off) in the CVGRecordStore (340), which abstracts device file system to provide helper methods for accessing records and fields. When the RatingEngine (230) may be started again, the ConfigRatingCollector (330) may be used to bootstrap the rules by reading the persistent store of Rules. The RecordStore (340) may be also used to hold information that may be synchronized between the DRE (110) and other remote systems (200).

Figure 4:
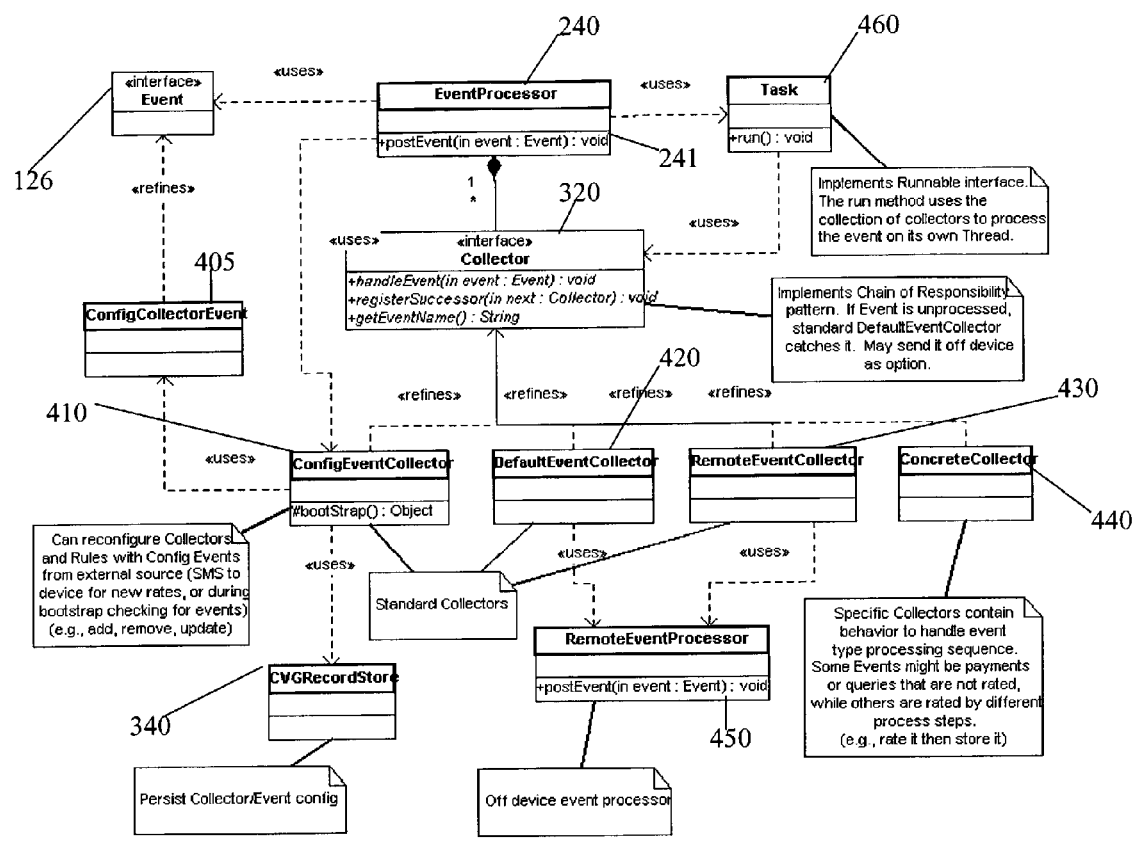
FIG. 4 illustrates an embodiment of the overall design of the event processor.
Figure 5:
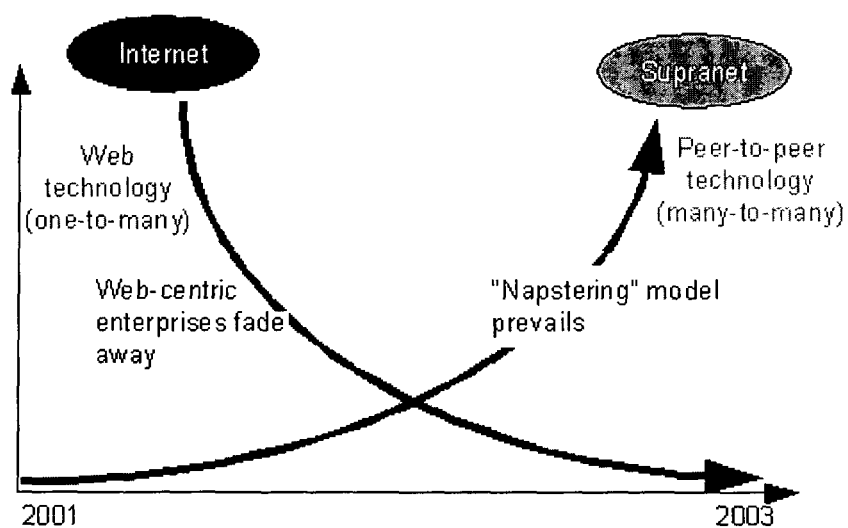
FIG. 5 illustrates a timeline from the client-server model to the Supranet.

Referring to FIG. 4, a diagram is shown which illustrates an embodiment of the overall design of the Event Processor (240) component of the DRE (110). The EventProcessor (240) class includes the Collector abstract class (320) which contains methods to manage the sub-collectors (i.e., 330, 410, 420, 430, 440). The subclasses of the Collector abstract class (320) will implement the required behavior to process their specific Event types. The Event interface (126) defines methods to determine the type and source of the Event (125). Event types provide the ability to categorize the Event (125). Collectors can be provided to process specific concrete events or for a specific set of event types. Concrete events may provide data used to process the Event (125) according to the specific needs of the Event (125).

The ConfigEventCollector class (410) refines the Collector Abstract class (320) and provides the behavior to consume ConfigCollectorEvent (405) objects. This collector (410) can reconfigure (add, remove, update) collectors and rules from a persistent store. The store may maintain the Collectors past the life span of the EventProcessor (240) instance (i.e., the device may be turned off). When the Event Processor (240) may be started again, the ConfigEventCollector (410) may be used to bootstrap the Collectors by reading the persistent store of Collectors.

The ConfigCollectorEvent (405) subclass may be used to administer the EventProcessor (240) remotely. This type of event (125) may be used to add, remove and update Collectors within the EventProcessor (240).

The RemoteEventCollector class (430) may be provided as a default collector that consumes Events (125) that should be queued for transmission to a remote system (150-180). The RemoteEventProcessor (450) class consumes events (125) transmitted from the local EventProcessor (240) and forwards them to the appropriate networked system for final consumption.

The DefaultEventCollector class (420) may be provided a default collector that consumes the event if all other Collectors have not consumed the Event.

A ConcreteCollector (440) may be an instance of a specific collector to perform specific behavior. These collectors (440) are aware of specific Event types and Event data to be processed. These collectors (440) are configured into the EventProcessor (240) as needed based on the posting of Events (125) by an Application (205).

The Task Class (460) may be used within the EventProcessor (240) to execute a unit of work associated with an Event that has been posted to the EventProcessor (240). The Task class can implement a platform specific thread interface, e.g. the java runable interface. Each event (125) that may be posted to the EventProcessor (240) may be placed into a Task object, and the Task may be executed using a pooled thread object.

The EventProcessor class (240) may be the only visible interface to the DRE system (110) to applications. The EventProcessor (240) exposes the method "postEvent" (241) through which all events (125) enter the DRE (115). The DRE (115) may be started by issuing a call to the static method "getProcessor" that returns the singleton EventProcessor (240) object. During the construction of the EventProcessor (240), it calls the ConfigEventCollector (410) to obtain the persisted configuration of Collectors and it also creates the Thread pool. Calling the "close" method, which waits for all Threads executing Tasks to complete before returning, stops the EventProcessor (240).

Figure 11:
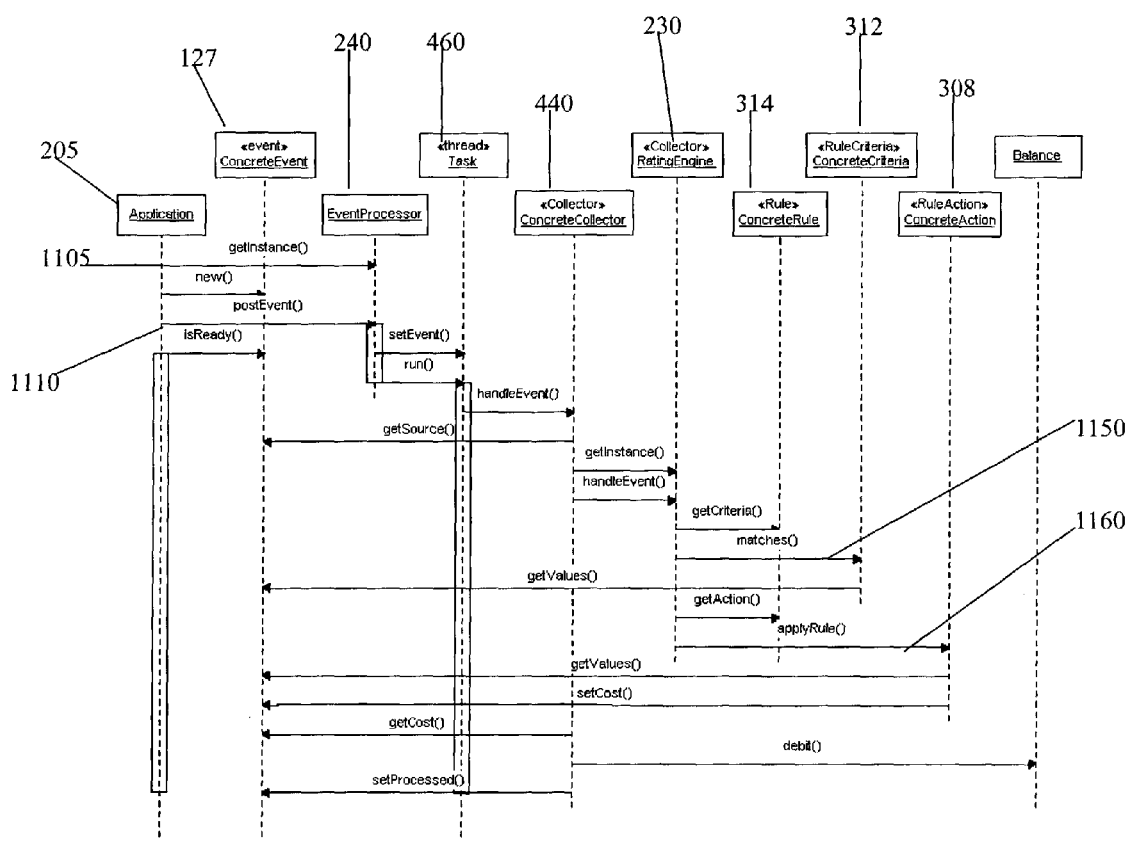
FIG. 11 depicts a simple set of interactions between an application, the EventProcessor, and the Rating Engine.

Referring to FIG. 11, an illustration of one embodiment of the invention may be shown which depicts a sample set of interactions between an Application (205), the EventProcessor (240), and the Rating Engine (230). In this embodiment, the DRE (110) is acting as an "in-process sequence", where the application (205) and the DRE (110) execute in the same process space on the device (i.e., in the same Java virtual machine, a symbian process, etc). When an Application (205) wants to make use of the DRE (110), specialized Events, Collectors, and Rules can be created for that application if the standard set of generalized objects do not satisfy the Application's (205) requirements. This sequence assumes that the ConcreteCollector (440) has registered an interest in the ConcreteEvent (127) class posted by the Application (205). The sequence diagram also illustrates the three main threads of execution during the processing of the event (125). The Application (205) runs on its own thread. The EventProcessor (240) also executes on its own thread with the primary function of accepting events (125) and handing them off to Task objects (460). The EventProcessor (240) may maintain a pool of threads to execute Task objects (460). The threads running the Task objects (460) are the third main set of threads involved in the processing of the Events (125). The EventProcessor (240) and the RatingEngine (230) are singleton objects. In object-oriented programming, a singleton class is a class that can have only one object (instance of the class) at a time. When the first reference may be made to obtain the EventProcessor (240), the DRE system (110) may be started. The Application (205) obtains a reference to the EventProcessor (240) by calling the static method EventProcessor.getInstance (1105). The Application (205) creates the ConcreteEvent object (127) with whatever information may be relative to the ConcreteEvent type. The Application (205) then posts the populated events to the EventProcessor (240). The ConcreteEvent (127) should implement a blocking call that suspends the thread of execution until the event state may be modified from unprocessed to processed. In this case, the isReady method (1110) may perform a blocking "wait". Once the "wait" releases, the method can check an error status on the event and respond appropriately (True/False). Events (125) can implement the ErrorHandler interface if the event wants to consume any errors that occur during the processing of the event. The ConcreteEvent (127) may then respond that an event failed and why back to the Application (205). If the "isReady" method (1110) response is "true", then the application (205) may proceed.

When an event posts to the EventProcessor (240), a Task object (460) may be created with the Event (127) to process the request. A thread may be removed from the pool of available threads and used to execute the task. At this point, this may be the EventProcessor's (240) only responsibility so that it can process events (125) as quickly as they are posted. When the task completes, the thread may be placed back into the pool of available threads.

The bulk of work may be performed within the Task object (460). Collectors (320) evaluate the type and source of the event (125) to determine if they should handle the Event (125). If a Collector (320) processes an Event (125), it marks the Event (125) as processed at the completion of their processing. This stops the chain of Collectors (320) from examining the Event (125). In this example, the ConcreteCollector (440) accepts the ConcreteEvent (127) for processing. The ConcreteCollector (440) directly calls the RatingEngine (230).

When an Event (127) may be posed to the RatingEngine (230), the rating Engine (230) evaluates the configured rating rules (314) to see which ones should be applied to the Event (125). Each Rule (314) provides a ConcreteCriteria object (312) that performs this evaluation. If the matches call (1150) on the ConcreteCriteria (312) returns "true", the associated ConcreteAction (308) may be applied to the Event (127). The ConcreteAction (308) may perform the rating and set the cost of the Event (125) directly into the Event (125). All rules that apply to the Event (127) will be processed (1160). Rules are applied in the priority order as specified during their configuration.

Figure 12:
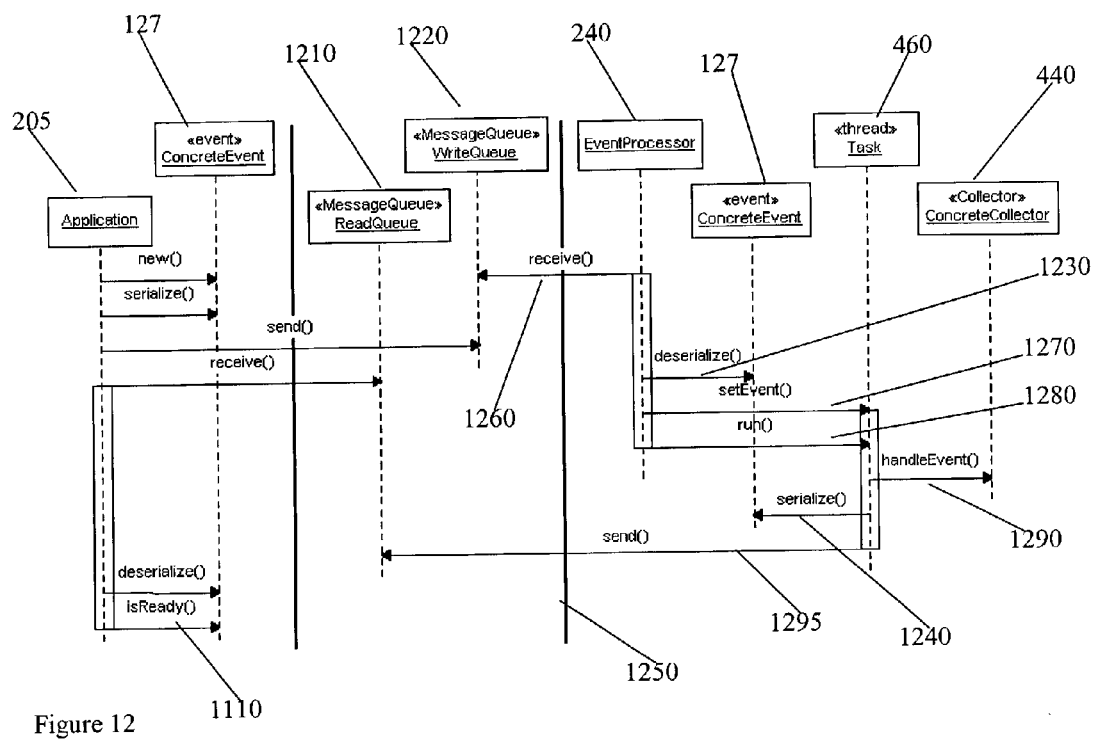
FIG. 12 displays the DRE (110) as an out-of-process model, where the application and the DRE execute in two different process spaces.

Referring to FIG. 12, an embodiment of the DRE (110) is displayed as an out-of-process model, where the application and the DRE execute in two different process spaces and communicate using through the operating system. In this embodiment, message queues are utilized. The three main threads of execution are depicted as the Application (205) waiting for a response, the EventProcessor (240) accepting requests and allocating threads for the Task (460) to process the Event (127). The details of the handleEvent method on the ConcreteCollector (440) remain the same as depicted in FIG. 11. In the out-of-process model, the primary difference may be the use of an intermediary to pass Event messages between the Application (205) and the DRE (110). These messages may be encrypted and digitally signed before they are sent across the open. Two queues may be enlisted to pass the messages of serialized Events. The WriteQueue (1220) may be used to send messages to the DRE (110) and the ReadQueue (1210) may be used to retrieve messages from the DRE (110). The Application's (205) main thread blocks on the receive method wait for a response back from the DRE (110). Once the message may be received, the message may be deserialized back into an Event. The "isReady" method (1110) may be then called on the Event (127) to test the result of the DRE (110) processing. This version of the isReady (1110) method doesn't block as in the in-process version.

The EventProcessor's (240) main thread performs a blocking call (1340) on the receive method (1260) against the WriteQueue (1220) waiting for messages to be posted for DRE (110) processing. Once a message is received (1260), the message may be deserialized (1230) into an Event Object (127). The Event Object (127) may be placed into a Task object (460) (1270), which may be then run (1280) a thread. The Task object (460) performs its normal processing by calling the appropriate ConcreteCollector (440) to handle (1290) the Event Object (127). The Task object (460) has the additional responsibility of serializing (1240) the Event (127) back into a message and posting that message (1295) onto the ReadQueue (1210) before the Task (460) completes.

Synchronization

In an embodiment of the invention, the DRE may execute in both connected and unconnected modes but a device and the backend system, at various times, may need to synchronize (220). For example, the device may maintain a store of information relating to the activities of the user on the device. The user may also have made a payment on the device. Likewise, administrators could have added new rules for pricing and billing. In these instances, the device may need to upload information to the backend system and the backend system may need to download information to the device. A Synchronization protocol may therefore be required between the two systems. In the device, this synchronization is always initiated by the system resident in the device.

The Operating System's network interface (640) may be used by the Synchronization Facility (220) to create a connection between the device (100) and a remote server (200). The connection offered may support the Secure Socket Layer (SSL) protocol or any other industry-accepted protocol. Operating System Facilities (640) may be the standard platform and system level services used by the DRE. They may include timing services (for the capture of events that have a timing element), IO facilities for the storage facility, and networking facilities for networked messaging.

To facilitate synchronization, the DRE (110) may maintain an event queue locally on the device (100). A second event queue may be maintained on remote systems (200) that collaborate in the distributed model. The DRE (110) may be configured to communicate with multiple back-end systems (150-180). When a connection may be established between these systems, events in these queues are exchanged between these systems. Each instance of the DRE (110) may be configured with a globally unique identifier that may be used to identify itself to the centralized systems (200). These centralized systems (200) may store many events in the queue for the many instances of the DRE system (110). When the DRE (110) connects, the unique ID may be presented to the centralized system (200), which responds by transmitting all of the associated events destined for that instance of the DRE system (110). The DRE (110) maintains the queue of events as a persistent store on the device (100). The sequence of events may be maintained within the store and may be transmitted to the centralized system in that order. When the DRE system (110) may be started, the EventProcessor (240) instantiates a timer object. The timer's responsibilities are to maintain a list of configured timing intervals and associated events that should be posted to the EventProcessor (240) when an interval may be reached. The timer uses a specialized Collector to receive Timing Configuration events from the administration system to add, remove and update the list of timed events. Timed events may be used to initiate synchronization with the back end systems (200). These events can be scheduled to execute when the DRE system (110) starts and or attempt to connect at a configurable interval/parameter. If the device (100) cannot obtain a connection, events continue to queue up in the synchronization store until the next interval. Some event types might require synchronization with back end systems (200) and should not be cached on the device (100). These events may cause an immediate synchronization with the back end (200) or result in an error message if a connection cannot be established. The user could be informed that they must move to a location with connectivity to proceed. The DRE (110) could also require the user be in an area with connectivity to perform a synchronization due to an accumulation of events or some other threshold such as prepay balance level.

Rate plans implemented within the RuleAction implementations may use time as a factor in determining the cost of an event. However, time may be relative. Time can represent the duration of time between two events. It can represent the time based on a centralized server or Greenwich Mean Time (GMT). Time can also represent the local time based on the location of the device. In order to determine time duration, the DRE (110) takes two or more snapshots of time and derives the duration based on the difference. Typically, the application would send two events to the DRE (110); some type of "start" event and some type of "end" event. During the processing of the start event, the DRE takes the initial snapshot of the current time. When the end event may be posted, the DRE takes the second snapshot of the current time. The start and end times are compared to derive the time interval between the two events.

The DRE (110) may also execute as an application on the device (100). It therefore may use the operating system on the device to determine time. It is immaterial to the DRE how the operating system determines time, it simply uses the timing facility provided by the operating system. Events that require the timestamp (date and time) of an event must have a trusted source of the timestamp. This type of event can be further broken down into events that are time zone sensitive and insensitive. The actual time of day may be difficult to securely determine simply on the device as the user can set and reset the time of day. Additional mechanisms may be in place to raise the level of trust of the device's (100) system clock for timestamp purposes. In between synchronizations, the DRE can intermittently validate the system clock by comparing a stored time value plus the interim validation period with the current system clock time. A discrepancy would indicate that the user has altered the system clock time.

During an initial startup, the DRE (110) may attempt to synchronize with the backend system. If the device cannot synchronize, then the system clock must exceed the last valid time stored within the DRE as time only moves forward, other than daylight savings time. If the device has not synchronized the GMT within some period of time (i.e., configurable hours or days), the system clock may lose its trusted status resulting in error messages displayed at the user. Stationary devices (i.e., set-top boxes) may be configured to obtain the time zone from the centralized billing system, which holds the device's location. Stationary devices that post time zone sensitive events can use the DRE trust building method described above.

Devices that are mobile may issue an off device request, to obtain the current time, based on the current location of the device (100). The off device time of day request may be fulfilled by either the network providing the user's connectivity or a chip on the device that automatically accepts time synchronization from external sources (i.e., utilizes the FLEX pager protocol and chip architecture by Motorola). Without a trusted time of day source, the events (125) would either be immediately synchronized or rejected.

The DRE (110) may support a plug-able networking layer. This may be based on the Sync-ML model. The initial set of plug-ins may support HTTPS, 802.11b and Bluetooth. A Java JINI interface may also be supported. The plug-able model may also enable the use of proprietary telecommunication carrier protocols over the user's existing cell phone connection (i.e., GPRS). The application level protocols may be XML/SOAP-based.

Architecture

Referring to FIGS. 7-10, the DRE may be deployed utilizing multiple models. Each model varies the layer where the DRE may be deployed. A fourth model (1000) is presented that is a variation of the Application deployment model (700). In all cases, the DRE requires some degree of services offered by the current or lower layers of the deployment stack. These services are accessed by application programming interfaces (APIs) offered at the various layers.

The deployment stack may comprise four layers: Application, Operating System, Firmware and Hardware. The hardware layer represents the lowest layer and embodies the physical device and its properties such as keypad, screen and CPU. Moving up one layer, the Firmware layer consists of operating instructions encoded directly into the hardware chip set. These chips provide the necessary services by executing the encoded instructions. The next layer up may be the Operating System layer that creates a hosting environment for applications on the device and provides an implementation or interface for the services on the device. The top layer may be the Application layer, where third party software typically executes on the device.

Referring to FIGS. 7-10, the DRE (110) may require up to nine services from the deployment platform depending on the deployment scenario. These should be conceived as logicial services offered in some way on the platform. They may not manifest themselves as specific physical API's to some physical service, but rather as a deployment methodology or process (e.g. the secure area is supported by installing on a tamper resistant co-processor.) The Secure Store service (710) offers the ability to restrict access to persistent data required by the DRE for state management. The Secure Area service (715) may be used by the Secure Store service and the DRE to provide limited access to storage or memory. The Secure Code service (720) ensures that only the appropriate code base executes as part of the DRE and that debuggers cannot attach to the executing process. The Encryption service (725) provides cryptography services. The Key Management service (730) provides a secure store for public and private cryptographic keys. The Secure Transport service (735) provides the ability to create secure (i.e., Secure Socket Layer (SSL)) connections to other networks. The Registry service (740) provides awareness of other applications on the device and those that will be collaborating with the DRE. The Networking service (745) provides the ability to create connections to other networked clients and servers. Finally, the Life Cycle service (750) provides the ability to start, execute, suspend, resume and terminate applications on the device.

Figure 7:
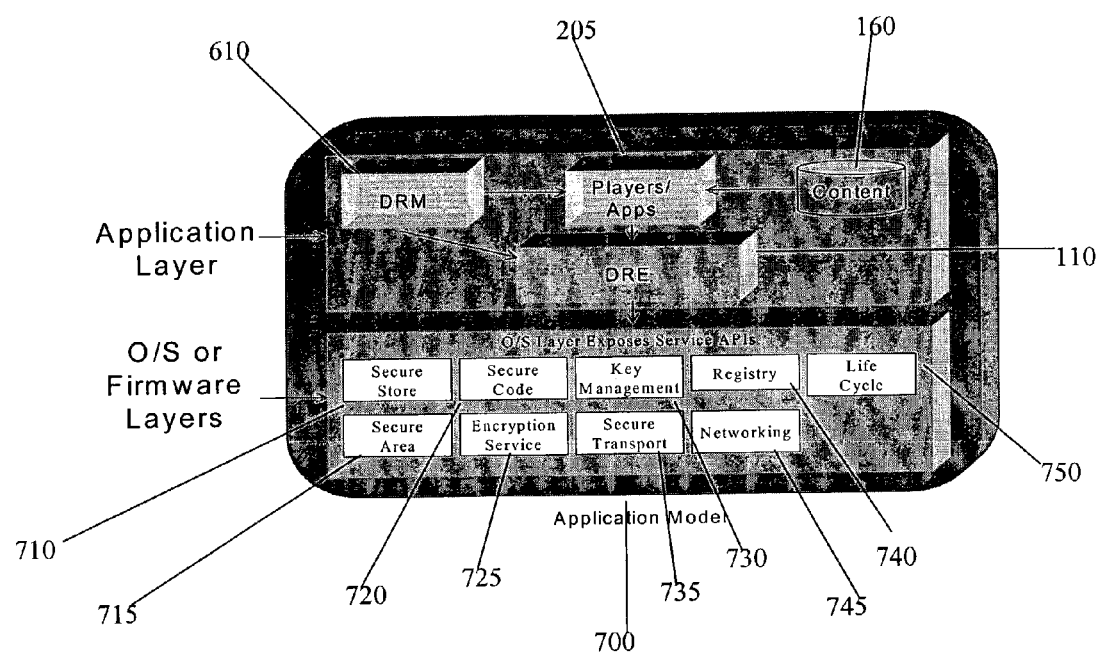
FIG. 7 illustrates one possible architecture for an application model embodiment of a device-based rating system.

Referring to FIG. 7, the DRE can be deployed using an Application deployment model. In this scenario, the DRE may be installed on the device just like all other applications. The DRE makes use of the required services by calling the operating system service APIs. The nine services can be deployed in either the operating system or firmware layers. The Application deployment model (700) provides the ability to deploy the DRE as a post-production application, where the DRE does not have to be installed by the device manufacture. DRE code updates may be downloaded over the air providing greater maintenance flexibility. However, this model also provides a higher degree of security challenges to ensure a secure code base.

Figure 8:
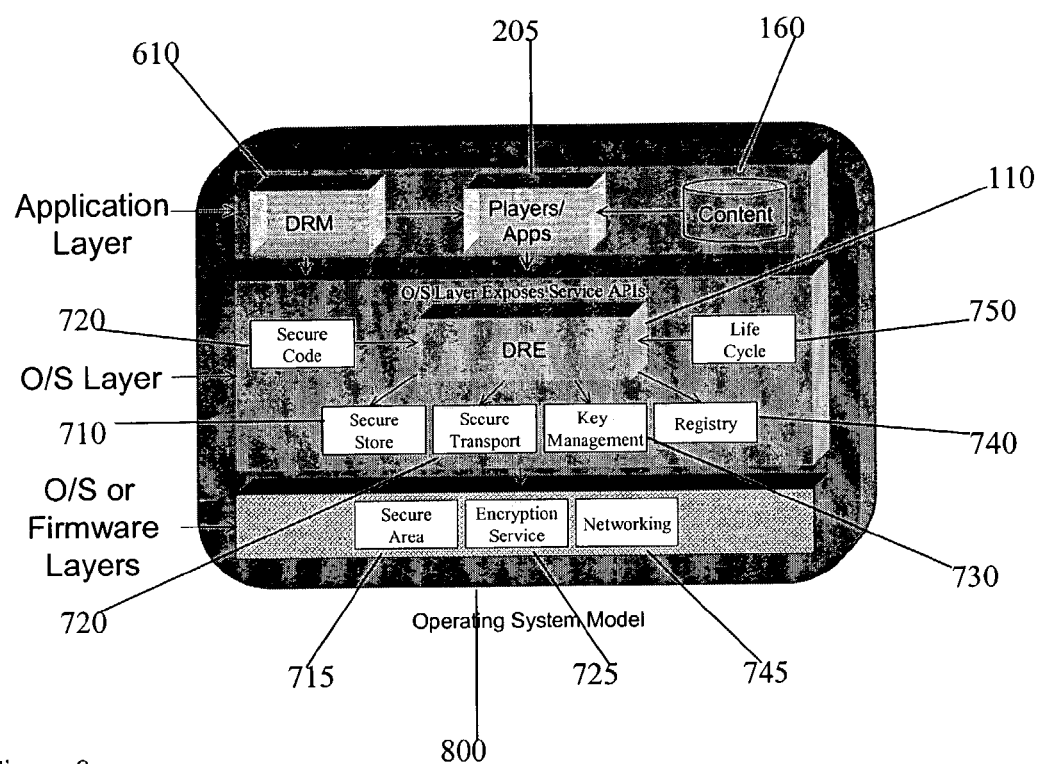
FIG. 8 illustrates one possible architecture for an operating system embodiment of a device-based rating system.

Referring to FIG. 8, the DRE can be deployed using an Operating System deployment model. In this scenario, the DRE may be installed as one of the standard operating system services. Applications, such as DRM and content players, access the DRE services by invoking operating system calls exposing the DRE as a service. In this model, the operating system provides secure code and life cycle services on the DRE code base. The DRE utilizes the Secure Store, Secure Transport, Key Management and Registry services within the same operating system layer. The Secure Area, Encryption and Networking services may be deployed within the O/S or Firmware layers (depending the O/S implementation).

The Operating System model (800) provides a more secure environment over the Application model (700) as the code base may be located and controlled within the device's (100) own O/S. However, this model requires the DRE to be incorporated by the O/S manufacture and pre-installed on the device prior to the consumer's use. Updates to the DRE code base might require O/S patches. Potentially, these patches can be downloaded overt the air and installed. DRE updates to price plan information—expressed as metadata—do not have the same O/S patch restriction. The DRE would also have to be ported to numerous operating system versions for numerous devices.

Figure 9:
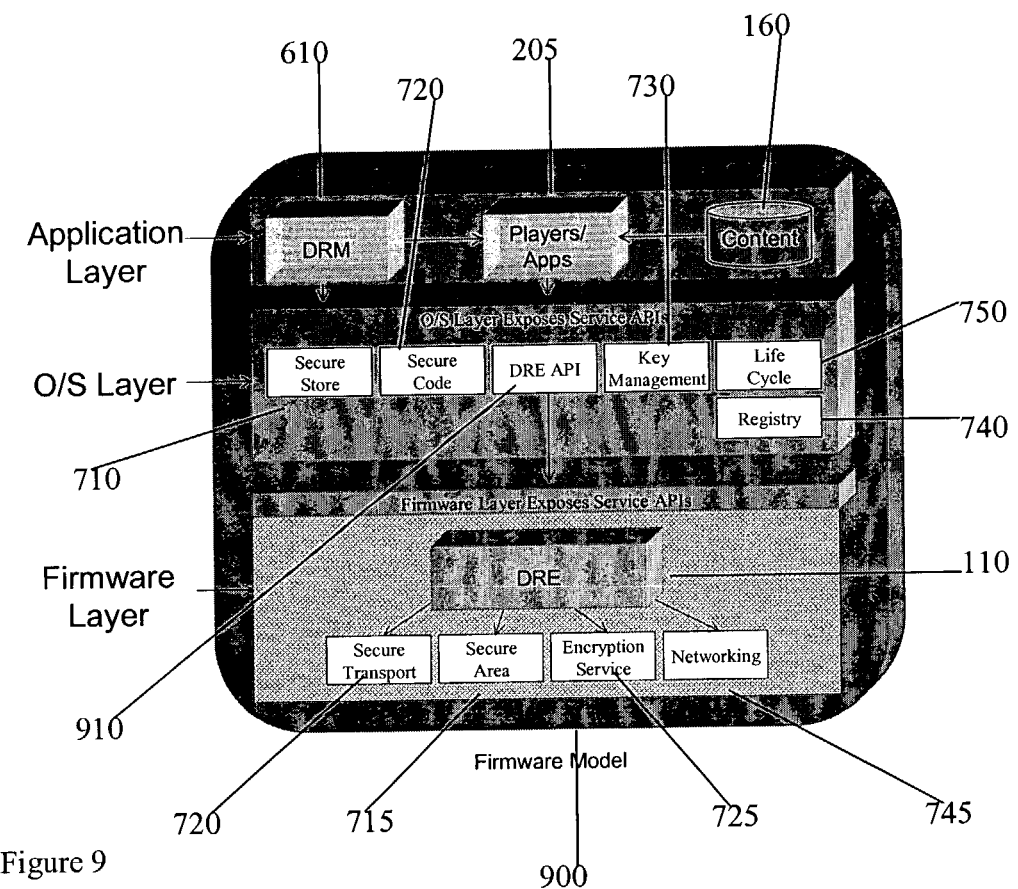
FIG. 9 illustrates one possible architecture for a firmware embodiment of a device-based rating system.

Referring to FIG. 9, the DRE can be deployed using a Firmware deployment model (900). In this scenario, the DRE may be installed into the device's chip firmware. Applications, such as DRM and content players, continue to access the DRE functionality through O/S layer APIs. However, these APIs are just proxies to the chip executing the DRE firmware instruction set. In this scenario, the DRE would only rely on the Secure Transport, Secure Area, Encryption and Networking services also offered at the firmware layer. The remaining services are not required in this deployment model.

The Firmware deployment model offers the most secure version of the deployment models. However, this model may be the most difficult to maintain. The only way to update the DRE code would be through firmware updates, an unlikely scenario for consumer devices. The DRE would also have to be ported to every chip set used by device manufactures incorporating the DRE.

Figure 10:
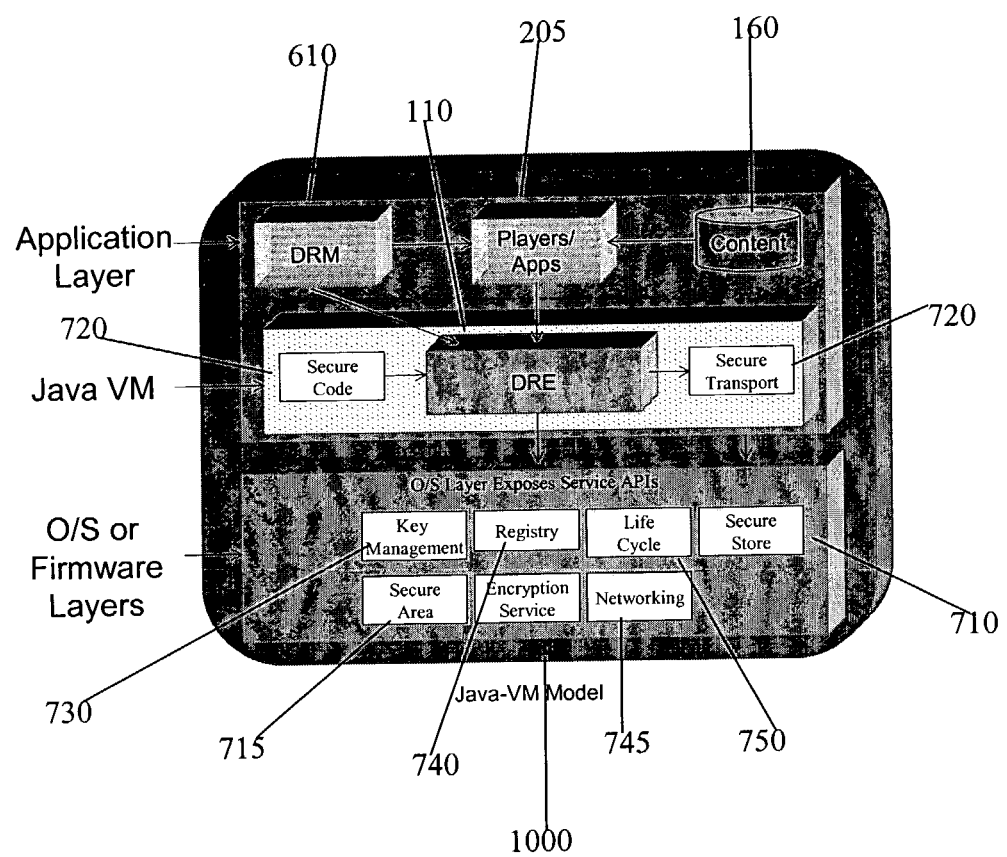
FIG. 10 illustrates one possible architecture for a Java-Virtual Machine (VM) embodiment of a device-based rating system.

Referring to FIG. 10, the final deployment model presented may be an extension of the Application model where the DRE may be deployed as a Java application that executes within a Java Virtual Machine controlled by the device's operating system. In this scenario, other applications access the DRE as just another application executing on the same device.

In a java based deployment model, the DRE uses the Secure Code and Secure Transport services offered by the Java VM. The remaining services are accessed by using the O/S APIs. This model provides a level of security that must be augmented by the O/S and device manufacture in the form of the depicted services. The Java-VM deployment model provides the greatest level of portability and maintainability. The J2ME environment enables a single code base to service many O/S—device combinations. The ability to download code and have the VM dynamically, and securely, load the code base enables the distributed maintenance of the DRE.

It may be also possible to have hybrid deployment models of the DRE, as well as C/C++ and Java embodiments. For example, in the event some of the services are not available, the DRE may implement the service. In the case of a Secure Area service, the DRE might provide an implementation of the service that requires a Firmware deployment, while the remainder of the DRE code base may be deployed using the O/S model.

Price Plans

Reputable, authorized, and trusted peer administrators (1460) define credit policies (1570). These credit policies define customer credit attributes that are to be used by the DRE prior, during and post rating of content and/or service usage. Credit policies (1570) such items as credit class; prepaid spending limits, and post-paid spending credit based on credit class. Assigned payment classifications (1540) identify whether customers are post-pay or pre-pay. These classifications have predetermined credit policies (1570) that may be used by the DRE (110). These classifications and their associated credit policies can be modified and enhanced.

Figure 15:
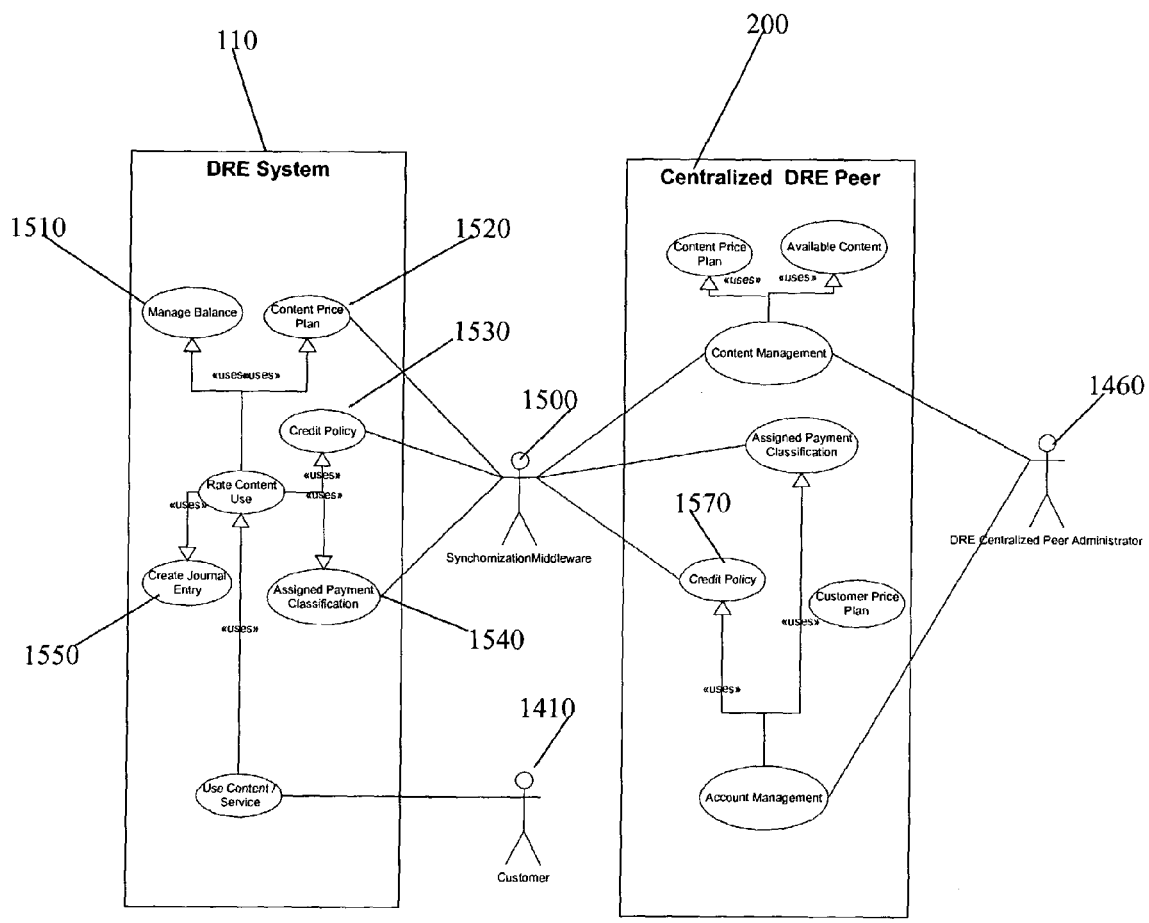
FIG. 15 illustrates the disposition of synchronization middleware and a DRE Centralized Peer Administrator between a DRE and a centralized DRE peer.

Referring to FIG. 15, DRE will rate content and services offered on a device (100). When the customer consumes content or a service the DRE may use the following rate factors to meter content and service usage: balance management (1510), content price plan (1520), credit policies (1530), payment classification (1540), content usage journal (1550), quality of service, number of bytes, etc. The DRE (110) may be capable of metering services based on the defined Content and/or Enterprise price plan (1520). A DRE will provide a standard set of price plans, but content and service providers are not limited to those price plans. Price plans are completely configurable and definable by the content provider and or enterprise provider. Price plans may be designed around per use, one time charges, duration of use, time of day, number of uses, etc. These plans may also be combined to create more complex price plans. A DRE (110) may be capable of complex price plan management on device and in conjunction with a peer. Price plans can reside on the DRE, may be acquired on demand by the DRE from a peer or may use a combination of one demand plan access and device resident price plan descriptions. On-device price plans have life cycles constraints that are defined by content and service providers. Life cycles constraints will define items such as how long a price plan may be valid, how often, and when the DRE should communicate to a peer to validate or update a resident price plan.

The Remote Settlement Agent (150) resolves how an individual payment may be split between collaborating parties that offer some type of service or content. The DRE (110) can perform settlement if there may be sufficient information on the device (100) or the DRE (110) can collaborate with a remote settlement agent to split the payments for consumed content.

A Network Billing System (180) provides the final billing for the user's voice and data network access. The DRE (110) can provide varying degrees of rating and summarization of network access events (125) and sent these onto the user's network provider for final billing.

Self-Care

Another aspect to the DRE may include the deflection of self-care from a call center to the end device. Each subscriber may have a user interface connected to their own on-device billing and rating Engine which allows the user to query the device for information relating to their account (usage, charges, etc.). As events occur and are priced and balances are adjusted, the DRE may maintain a running log of such transactions. These logs may record various attributes of the event processing (data and time, location, etc.). These logs may be transferred to back-end systems for long-term storage and balance reconciliation. The policy for such interactions may be configurable.

Because the DRE can rate and maintain the balance on the device, the self-care system will work even when the device is not connected to the network. The information may be up-to-date and available in real-time and does not have to be mediated by a central system or accessed by a customer service representative. This could offer significant reductions in the number of call center representatives as well as some automated systems (IVR, Web Self Care) since the processing and access may be performed out on the device itself.

Figure 16:
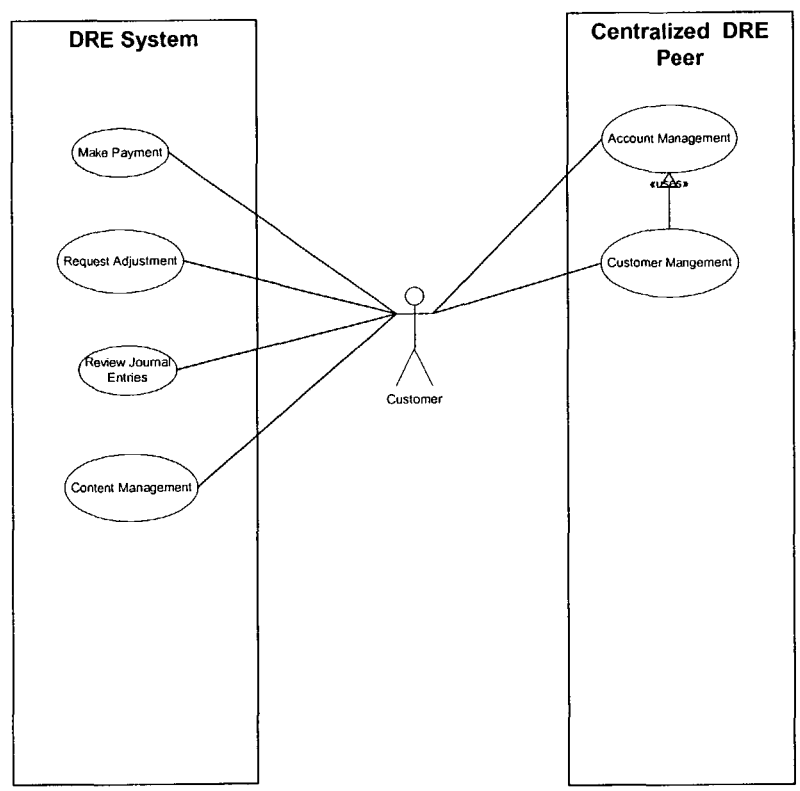
FIG. 16 displays the relationship between the journalizing functionality on the DRE and Customer Management functionality on a centralized DRE peer.

Referring to FIG. 16, because content and service transactions may be rated in real-time on the DRE (110), the customer (1410) has immediate usage information available from the DRE Journal (1551). For enterprise subscription payment or immediate transaction/service payments, the DRE (110) can perform immediate payment debits from the DRE account balances.

Figure 14:
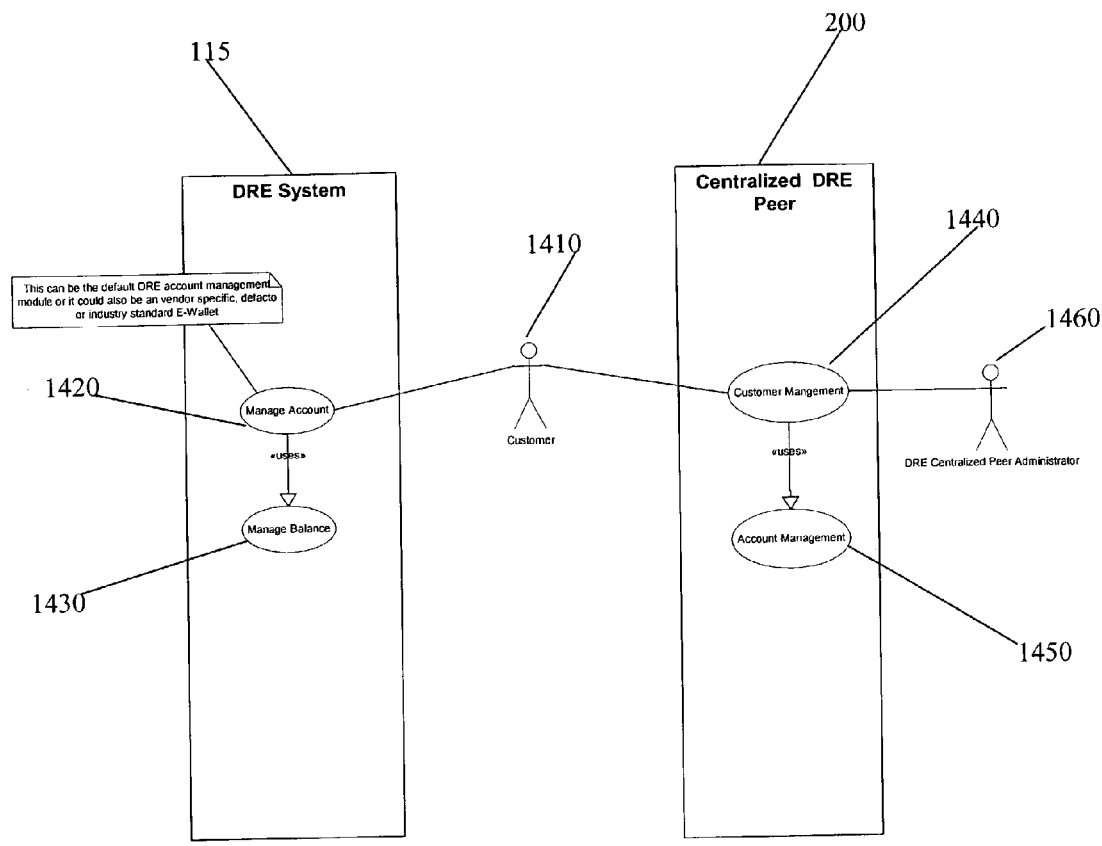
FIG. 14 illustrates the disposition of a customer between a DRE and a centralized DRE peer.

Referring to FIG. 14, customers (1410) will manage their accounts (1420, 1430) primarily on their devices (100) using the DRE (110). This can be the default DRE account management module or it could also be a vendor-specific, de facto or industry standard wallet. This does not, however, preclude management of the account (1450) on the centralized peer (200) through a web browser on their device or another device.

All rating transactions are logged by DRE (110) into a Journal (1550) that may be used by the DRE self-care interface. The DRE journal (110) can be used by customers (1410) to review content and service usage. The users may also use the journal to log charge disputes. The DRE (110) will forward any dispute onto the appropriate peer for dispute resolution.

Digital Rights Management

Finally, the DRE may collaborate with an on-device digital rights system to meter and unlock content for consumption by an end user.

Figure 2:
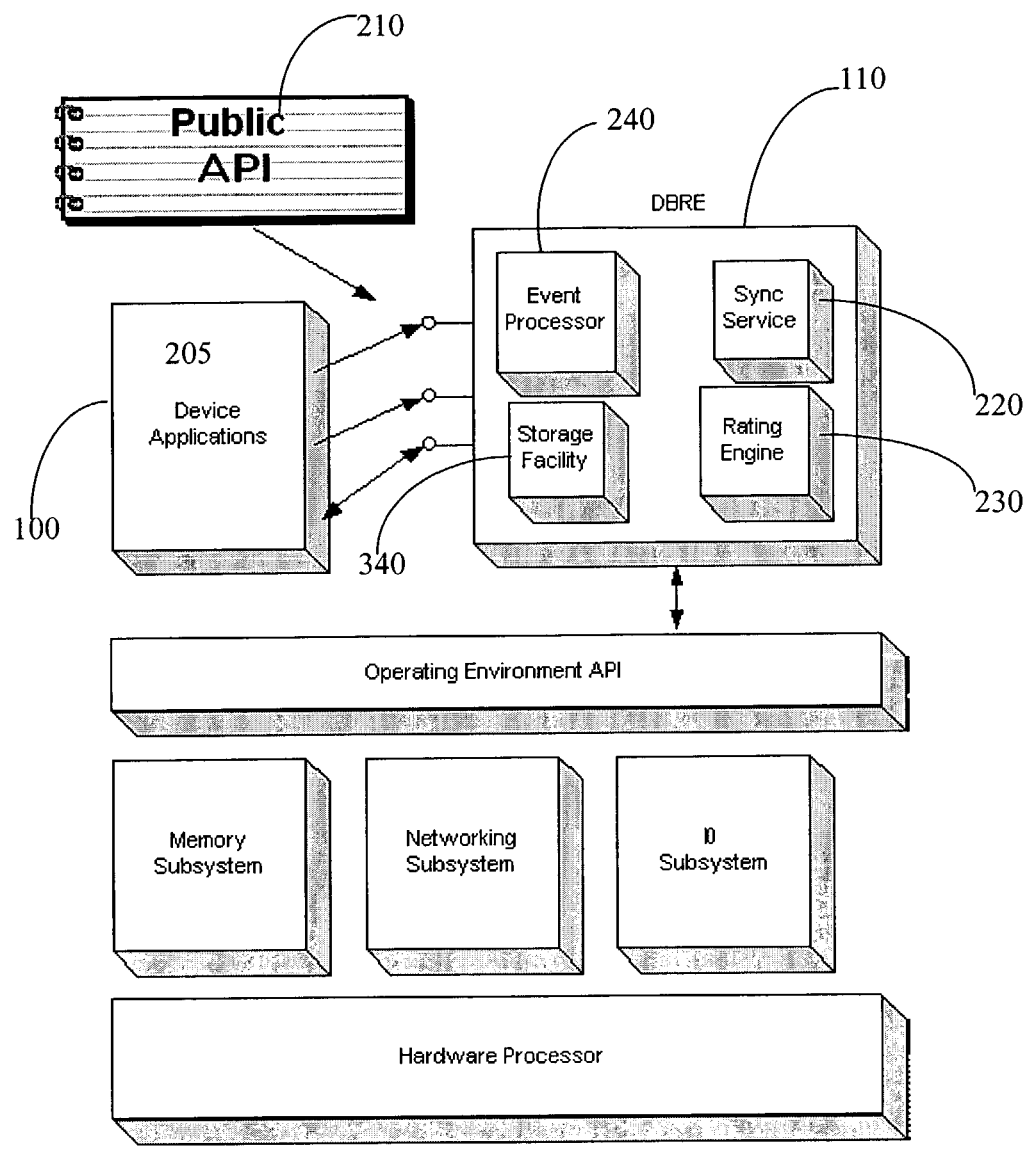
FIG. 2 illustrates an embodiment of the system utilizing APIs.

Referring to FIGS. 1 and 2, applications on the device (100) may interface to the DRE (110) through published application programming interfaces (API) (210). These may be created via the standard library code interface mechanisms that are available for each targeted environment for the DRE (110). Through this local API (210), applications may publish events for rating and billing and query the DRE (110) for statistics and rate information.

The Event Processor (240) processes events (125) as they are posted by applications (205). Every application (205) may define the concrete event types specific to their application needs through the public Application Programming Interface (210).

Examples of such applications include device-based games, digital rights management solutions, and network access/usage systems (broadband content consumption, VOIP, data services, and voice services).

Localized content (140) may represent some type of application or digital content residing on the device (100) (i.e., telephony applications, games, content display, MP3 players, etc.) and being managed by a resident Digital Rights Management System that produces events (125) and sends them to the DRE (110). One embodiment may include a game that executes on the device (100) and sends a "play game" event (125) to the DRE (110). The game in this case comprises the localized content (140). The "play game" event (125) may be rated and billed by the DRE (110).

A content provider (160) may provide their own system that performs some additional function against events (125). These events (125) may be passed through the DRE (110), possibly processed, and sent to the content provider's system (160). In an embodiment of this functionality, a gaming company may offer a token credit for the highest score of the month. High score events (125) may be passed from the DRE (110) to the content provider's system (160). The content provider (160) may award the winner(s) with credit events, which may be synchronized (220) with the DRE (110). These interactions may be transparent.

When the content may be consumed on the device, the DRE (110) can perform the rating and billing functions. The resulting information can be sent to third party networked content providers for settlement or final billing. Settlement may also be handled on the device itself in a pre-paid model or through third party settlement agents such as Visa.

The end devices (100) may maintain a user interface. This interface can use the API layer to access the DRE (110) for information. Using such an interface, the subscriber can check balances, view history, perform transactions, etc.

Peer-To-Peer

The Central System (170) may also provide additional billing and rating functions that employ a cross-device perspective. This may allow the end provider to support price plans that take advantage of cross-product discounts, specialized loyalty arrangements, and access to shared/pooled resources such as pooled game minutes, shared volumes of downloaded content, etc. For example, in an embodiment of this functionality, a family could purchase a plan that allowed them a certain shared number of video clips per month that would be shared across all of the devices (100). As they were used, the end device (100) may reserve the content and provide the on-device billing and balance while the CRB (170) may handle the reservation and perform the end reconciliation across the devices (100). This shared perspective of the CRB (170) may also allow discounts to be provided which may be downloaded to the device (100) as a credit to the kept balance.

Discounts may, in one embodiment, be applied at a centralized peer or, in another embodiment, the devices participating in the discount arrangement may also synchronize with each other over a peer-to-peer network and calculate their own discount.

The centralized system may be used to configure the billing arrangement as well as the rating and discounting information into the DRE (110). The additional billing arrangement information may be used by the DRE to identify the P2P addresses of the other devices that will participate in the bill cycle discounting. One of the devices may be also declared as the coordinator of the bill cycle processing. The coordinator device may be the one that actually runs the bill cycle processing on behalf of all the devices in the billing arrangement. The centralized system may also be used to configure the policy that will be employed in the event that any device may be unavailable to participate in the billing cycle for an extended period of time. Each device continues to capture events and perform their individual rating. These rated events are stored on the individual devices as usage. When the device reaches a synchronization point, it attempts to establish a connection with the coordinating device in the billing relationship. If a connection can be established, the summarization event may be transmitted to the coordinating device. Depending on the reporting requirements of the application and billing contracts, the usage and/or summarization event might be synchronized with a remote system for historical references. The coordinating device has the additional responsibility of accumulating the summarization usage events and applying cross device discount based on the account's price plan. The final amount can either be presented to the device's user for electronic payment, or transmitted off the device for bill presentment and settlement. The connection can be configured to occur at regular intervals and durations so that the other devices can expect the coordinator to be connected at certain times for synchronization. These devices can synchronize the P2P rendezvous intervals based on the coordinator broadcasting its clock time value to the other devices in the billing arrangement. These devices don't need to rest their clock; they just need to derive the next rendezvous point based on the coordinator device's time. This limits the amount of time the devices must be on the network.

Network and content providers can also offer price plans that offer a pool of units that can be shared across devices that participate in the billing arrangement. The units (i.e., dollars, time, and tokens) may be allocated to specific devices or allotted on an as-needed basis. There are two models to manage the balance of units residing in devices: centralized allocations and peer balance leveling.

In the Centralized Allocations model, a centralized system may be used to maintain the master value of units for the entire set of devices in the billing arrangement. As the devices consume units, the DRE instance will reach a low balance threshold, and the DRE will attempt to acquire another set of units from the central system. If the central system has additional pre-paid units available to allocate to the requesting device, it transfers the units to the device's balance by sending an adjustment event to the DRE. The DRE accepts the event and adjusts the stored balance to reflect the adjustment. In the event the central system has an insufficient amount of units remaining, it must execute a purchasing routine to acquire additional pre-paid units for the master balance.

In the Peer Balance Leveling model, the DRE instances on the devices participating in a billing arrangement could "spend" balance among themselves. The peers use a peer configured as a coordinator to maintain the master balance. The coordinating peer may be the peer that must synchronize with the central system to purchase additional units and perform sanity checks on the master balance. When the peers rendezvous with the coordinating peer, as described in the previous section, they have the opportunity to shift unused balances from one device to another based on spending patterns derived from usage events. This model allows devices with higher unused balances to be shifted to devices that consume higher amounts of units.

Point of Sale

A consumer's device with a DRE and a merchant's Point of Sale (POS) system could collaborate to determine the customer's final price of items based on historical information and e-coupons stored within the consumer's device. In this case, the DRE and POS system act as peers to perform real-time rating and discounting of items the consumer may be purchasing.

Typically, the POS associates a flat rate with a given item. There are currently two ways to provide customers with discounts; coupons and rebates. The rebates include both prepay, where the vender refunds the discount, and post-pay where the vender discounts the amount due on the consumer's bill. The DRE-POS collaboration provides enhanced solutions for each of these methods as well as provide for additional discounting models.

The POS issues an event to the DRE, which evaluates its list of e-coupons. Upon finding a match, the discount may be applied and the new amount and discount information may be returned to the POS. Any settlement for the discount between the merchant and vender can also be handled by the DRE and the centralized system.

In addition, the e-coupon can support various discounting models, such as 20% off the first purchase and 15% off the second. E-Coupons could also support discounts based on volume purchases of an item across a given duration. For example, 20% off of your next two purchases if you purchase five of our cereals this month.

Mail-in rebates require an inconvenience to the consumer and manual-processing overhead by the vendor. The DRE-POS collaboration could combine the purchasing information (i.e., date of sale, amount, UPC) with the consumer's information (i.e., name, address) to electronically supply the rebate data to the vendor for settlement. If the vendor supplied a Web Service interface, the amount could be directly discounted in real-time from amount due.

The DRE may also maintain the purchasing history (for participating vendors) on the consumer's device. When the POS sends an event to the DRE for rating, the DRE can calculate the discount and return the new amount in real-time. The POS amount due can then reflect the discounted price.

The merchant's POS and consumer's device first establish a secure wireless connection using an industry standard short distance technology, such as Bluetooth. The POS establishes a level of trust with the consumer's device by sending an event to the DRE requesting identification of the device. If the consumer's DRE participates in the merchant's POS rating/discounting plan, a digitally signed token may be returned to the POS system and verified.

The token can either be an opaque merchant token, or a DRE authentication token. If the token is merchant generated, it may be merely stored on the DRE and passed back to the merchant on valid requests from the authoring merchant. The DRE authentication token may contain attributes such as customer and device identification information along with timestamps and a random token.

If the token is the merchant token, they perform their own validation within the POS system. If the token is a DRE authentication token, the merchant's POS may be configured with a DRE authentication utility to process DRE authentication tokens. The DRE POS authentication utility may be configured to trust the device if the token can successfully be decrypted without further validation. The merchant may also configure the utility to validate additional attributes such as the timestamps and random token against the centralized system. Upon successful validation by the DRE POS authentication utility, a new DRE authentication token may be generated and signed by the merchant's system and sent back to the consumer device's DRE for storage. If the centralized system is in use, these additional attributes may be updated in the centralized system in order to validate the token on the next interaction.

Conclusion

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A computerized system for independently processing transaction events comprising:
    a host system; and
    a first end device and at least one additional end device, each end device comprising:
        a nonvolatile memory, said nonvolatile memory having stored thereon an account balance;
        a third party application program configured to play content;
        an engine configured to independently process a transaction event received from said third party application program, wherein said transaction event comprises an activity comprising consumption of content performed by a user via use of said end device, wherein said activity is capable of being measured, billed or authorized, wherein independently processing said transaction event comprises calculating an amount for said transaction event and adjusting said account balance by said amount without requiring interaction with any other device not physically integrated with and fixed as part of the end device;
    wherein said engine is further configured to:
        receive an event or processing;
        process said event while disconnected from said host system; and
        selectively establish a communication link with said host system to synchronize with said host system;
    wherein the engine of the first end device is configured to selectively establish a communication link with said at least one additional end device to synchronize one or more events processed on said at least one additional end device with said first end device.

2. A computerized system as claimed in claim 1 wherein said host system further comprises a billing system and wherein said first end device is configured to offer a meterable service.

3. A computerized system as claimed in claim 2 wherein said host system further comprises a settlement agent.

4. A computerized system as claimed in claim 3 wherein said host system further comprises a rating engine.

5. A computerized system as claimed in claim 4 wherein said host system comprises a content provider system.

6. A computerized system as claimed in claim 1 wherein said synchronization with said host system comprises synchronization of one or more elements selected from the group consisting of: said account balance, one or more usage records, one or more price plans, one or more payment classifications, and one or more credit policies.

7. A computerized system as claimed in claim 1 wherein said engine selectively establishes said communication link when a level of traffic within a network, connecting said end device and said host system, is operating within a predetermined level.

8. A computerized system as claimed in claim 1 wherein said engine may send said event to said host system for further processing.

9. A computerized system as claimed in claim 1 wherein said engine may send said event to a third party application provider for further processing.

10. A computerized system as claimed in claim 9 wherein said third party application provider sends a credit to a subscriber in response to an event processed by said engine by sending a new event comprising said credit in a set of metadata embodied in said new event.

11. A computerized system as claimed in claim 1 wherein said engine is configured to independently process a content consumption event.

12. A computerized system as claimed in claim 11 wherein said engine may determine a content type for said content consumption event and choose an algorithm appropriate for said type.

13. A computerized system as claimed in claim 1 wherein said engine further includes a journal, comprising a summary of events processed on said end device, accessible via a user interface on said end device and wherein a user of said device may access said journal and view said summary of events.

14. A computerized system for processing events wherein said computerized system comprises:

a first end device and at least one additional end device wherein said first and said at least one additional end device each comprise:

a nonvolatile memory, said nonvolatile memory having stored thereon an account balance;

an engine configured to independently process at least one transaction event, wherein said at least one transaction event comprises an activity performed by a user via use of said end device, wherein said activity is capable of being measured, billed or authorized, wherein independently processing said transaction event comprises calculating an amount for said transaction event and adjusting said account balance by said amount without requiring interaction with any other device not physically integrated with and fixed as part of the end device;

wherein said engine of said first end device may selectively establish a communication link with said at least one additional end device to synchronize one or more events processed on said at least one additional end device with said first end device.

15. A computerized system for processing events as claimed in claim 14 wherein said first end device is configured to:

a) receive a link initiated by said at least one additional end device; and b) using said link, reallocate the account balance stored on the first end device and the account balance stored on the at least one additional end device.

16. A computerized system for processing events as claimed in claim 15 wherein said reallocation is performed according to a predetermined formula.

17. A computerized system for processing events as claimed in claim 14 wherein said at least one additional end device comprises another type of end device than said first end device.

18. A computerized system for processing events as claimed in claim 14 wherein a single rating plan encompasses activity on said first end device and said at least one additional end device.

* * * * *

UNITED STATES PATENT AND TRADEMARK OFFICE
CERTIFICATE OF CORRECTION

| | | |
|---|---|---|
| PATENT NO. | : 8,484,130 B2 | Page 1 of 1 |
| APPLICATION NO. | : 10/392496 | |
| DATED | : July 9, 2013 | |
| INVENTOR(S) | : Irwin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2,607 days.

Signed and Sealed this
Thirtieth Day of December, 2014

Michelle K. Lee
*Deputy Director of the United States Patent and Trademark Office*